(12) United States Patent
Iben et al.

(10) Patent No.: US 12,148,457 B1
(45) Date of Patent: Nov. 19, 2024

(54) MAGNETIC TAPE REUSE ACROSS PRODUCTS

(71) Applicant: International Business Machines Corporation, Armonk, NY (US)

(72) Inventors: Icko E. T. Iben, Santa Clara, CA (US); David Lee Swanson, Tucson, AZ (US); Kevin Bruce Judd, Tucson, AZ (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/387,776

(22) Filed: Nov. 7, 2023

(51) Int. Cl.
*G11B 5/588* (2006.01)
*G11B 5/008* (2006.01)

(52) U.S. Cl.
CPC .......... *G11B 5/588* (2013.01); *G11B 5/00813* (2013.01)

(58) Field of Classification Search
None
See application file for complete search history.

(56) References Cited

U.S. PATENT DOCUMENTS

| | | | |
|---|---|---|---|
| 5,535,068 A * | 7/1996 | Hughes | G11B 20/18 |
| 5,926,336 A | 7/1999 | Le et al. | |
| 5,940,237 A * | 8/1999 | Takagi | G11B 5/012 360/75 |
| 7,095,583 B2 | 8/2006 | Johnson et al. | |
| 7,307,809 B2 | 12/2007 | Neumann | |
| 7,602,579 B2 | 10/2009 | Biskeborn et al. | |
| 7,652,841 B2 | 1/2010 | Kawakami et al. | |
| 8,493,829 B2 | 7/2013 | Katagiri | |
| 9,142,224 B2 | 9/2015 | Hansen et al. | |
| 9,183,878 B2 | 11/2015 | Cherubini et al. | |
| 11,100,945 B2 | 8/2021 | Yamaga et al. | |
| 11,532,325 B1 | 12/2022 | Le et al. | |
| 11,605,399 B2 | 3/2023 | Peng et al. | |
| 2004/0130818 A1 * | 7/2004 | Chliwnyj | G11B 5/584 |
| 2006/0061898 A1 * | 3/2006 | Nakao | G11B 5/584 |
| 2007/0247738 A1 * | 10/2007 | Yamagishi | G11B 5/09 |
| 2009/0040643 A1 | 2/2009 | Weng et al. | |
| 2009/0231756 A1 * | 9/2009 | Koeppe | G11B 5/4893 360/110 |

(Continued)

FOREIGN PATENT DOCUMENTS

EP 1276099 A2 1/2003
WO 2012174015 A1 12/2012

OTHER PUBLICATIONS

Iben et al., U.S. Appl. No. 18/387,758, filed Nov. 7, 2023.
(Continued)

*Primary Examiner* — Peter Vincent Agustin
(74) *Attorney, Agent, or Firm* — Zilka-Kotab, P.C.

(57) ABSTRACT

A method, in accordance with one aspect of the present invention, includes writing, by a tape drive, data tracks to a data band of a magnetic tape having servo bands flanking the data band, the writing being performed using a magnetic head that is not designed for a format of the magnetic tape. An effective pitch of servo readers of the magnetic head used simultaneously during the writing matches a servo reader pitch specification of the format of the magnetic tape. An average effective pitch of write transducers of the magnetic head is greater than a data track pitch specification of the format of the magnetic tape.

25 Claims, 26 Drawing Sheets

(56) References Cited

U.S. PATENT DOCUMENTS

| | | |
|---|---|---|
| 2012/0212848 A1 | 8/2012 | Katagiri |
| 2013/0063836 A1* | 3/2013 | Bui .................... G11B 5/584 |
| 2021/0065741 A1 | 3/2021 | Nakao |
| 2023/0129110 A1 | 4/2023 | Nakao et al. |

OTHER PUBLICATIONS

Iben et al., U.S. Appl. No. 18/387,789, filed Nov. 7, 2023.
Iben et al., U.S. Appl. No. 18/503,545, filed Nov. 7, 2023.
Iben et al., U.S. Appl. No. 18/503,563, filed Nov. 7, 2023.
Ibm, List of IBM Patents Or Patent Applications Treated As Related, dated Nov. 16, 2023, 2 pages.
Raeymaekers et al., "Design of a dual stage actuator tape head with high-bandwidth track following capability," Microsystem Technologies, vol. 15, 2009, pp. 1525-1529.
Non-Final Office Action from U.S. Appl. No. 18/387,758, dated Jun. 13, 2024.

\* cited by examiner

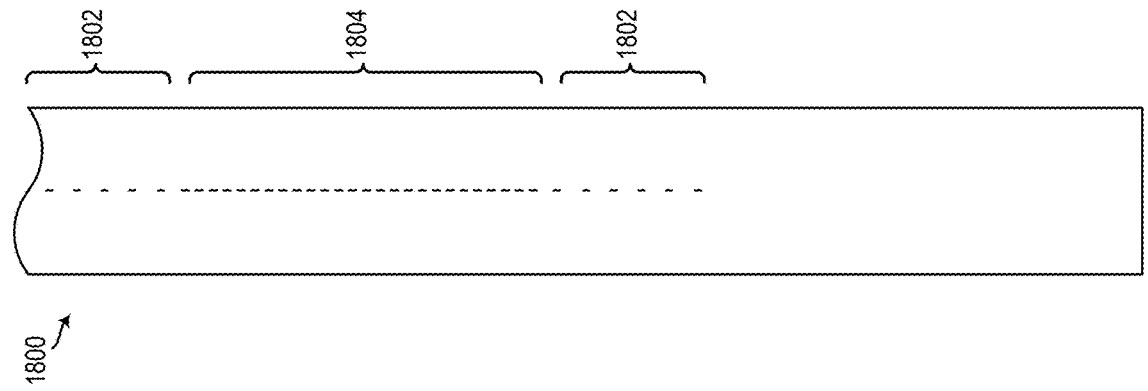
FIG. 18
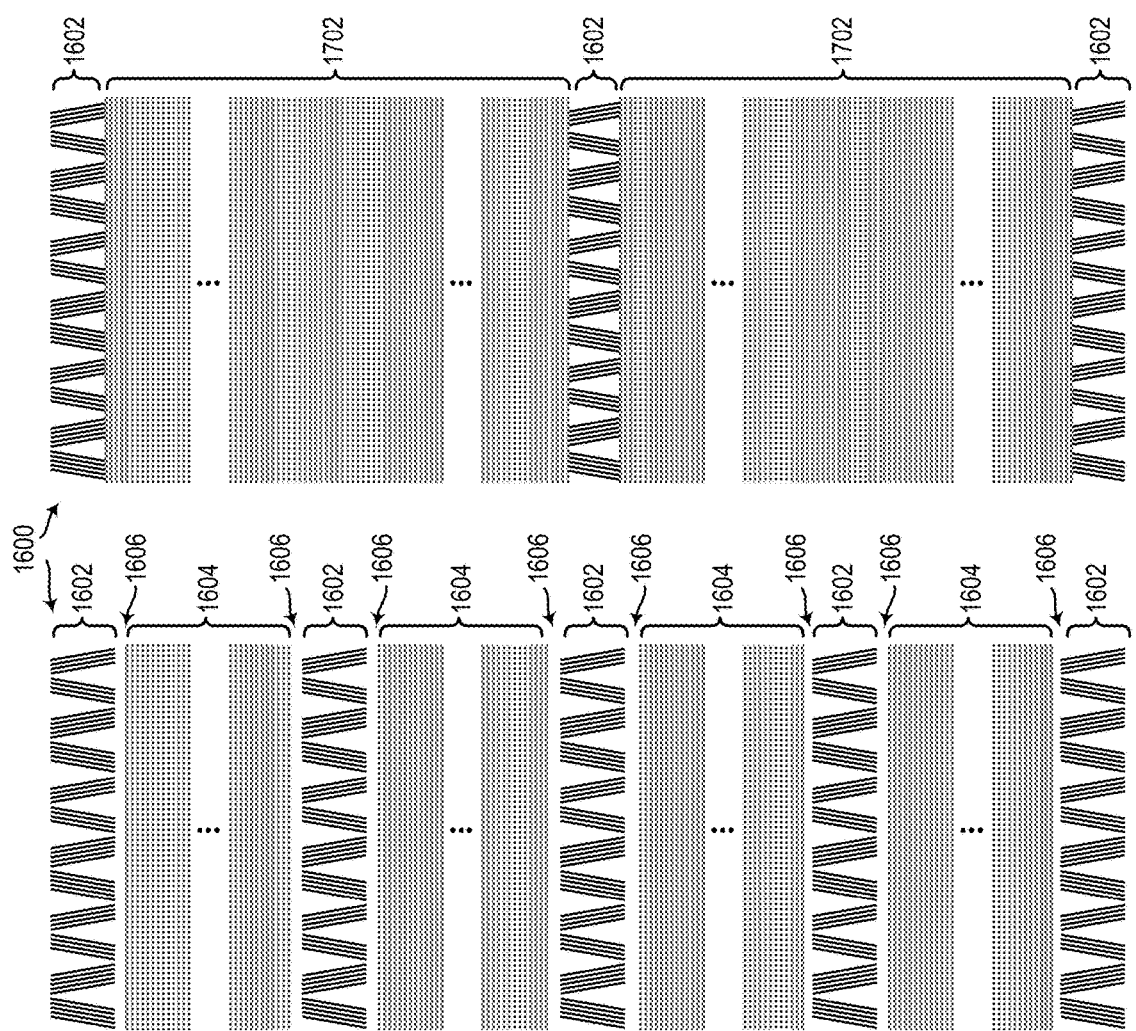
FIG. 17
FIG. 16

MAGNETIC TAPE REUSE ACROSS PRODUCTS

BACKGROUND

The present invention relates to data storage systems, and more particularly, this invention relates to enabling media reuse across products by increase the writable area of magnetic tapes and/or using servo band overwrite.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

Storing data on recording tape media is a low-cost approach to storing large scale data. However, the cost of developing the media for a given format is expensive. Increasing the number of products which can use the same media format lowers the overall cost of the media.

What is needed is a way to extend the use of magnetic tapes, having servo bands specific to a given media format, across products using different read/write head designs, especially those that are not compliant with the particular media format.

SUMMARY

A method, in accordance with one aspect of the present invention, includes writing, by a tape drive, data tracks to a data band of a magnetic tape having servo bands flanking the data band, the writing being performed using a magnetic head that is not designed for a format of the magnetic tape. An effective pitch of servo readers of the magnetic head used simultaneously during the writing matches a servo reader pitch specification of the format of the magnetic tape. An average effective pitch of write transducers of the magnetic head is greater than a data track pitch specification of the format of the magnetic tape.

A method, in accordance with another aspect of the present invention, includes writing, by a tape drive, data tracks to a data band of a magnetic tape having servo bands flanking the data band, the writing being performed using a magnetic head that is not designed for a format of the magnetic tape. An effective pitch of servo readers of the magnetic head used simultaneously during the writing does not match a servo reader pitch specification of the format of the magnetic tape. An average effective pitch of write transducers of the magnetic head is greater than a data track pitch specification of the format of the magnetic tape.

An apparatus, in accordance with one approach, includes a drive mechanism for passing a magnetic tape over a magnetic head, and a controller electrically coupled to the magnetic head. The controller is configured to perform any combination of the foregoing methodology.

A computer program product for enabling use of a magnetic tape by a tape drive not designed for a format of the magnetic tape, in accordance with one aspect of the present invention, includes a computer readable storage medium having program instructions embodied therewith. The program instructions are executable by the tape drive to cause the tape drive to perform any of the foregoing methodology.

Any of these approaches may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects of the present invention will become apparent from the following detailed description, which, when taken in conjunction with the drawings, illustrate by way of example the principles of the invention.

BRIEF DESCRIPTION OF THE DRAWINGS

FIG. 16 is a representation of a servo and data band layout on a magnetic tape as specified by a predefined format.

FIG. 17 illustrates the magnetic tape of FIG. 16 in which two of the servo bands are overwritten, in accordance with one approach.

FIG. 18 depicts a representation of a magnetic head that wrote the data bands of FIG. 17.

DETAILED DESCRIPTION

Figure 1:
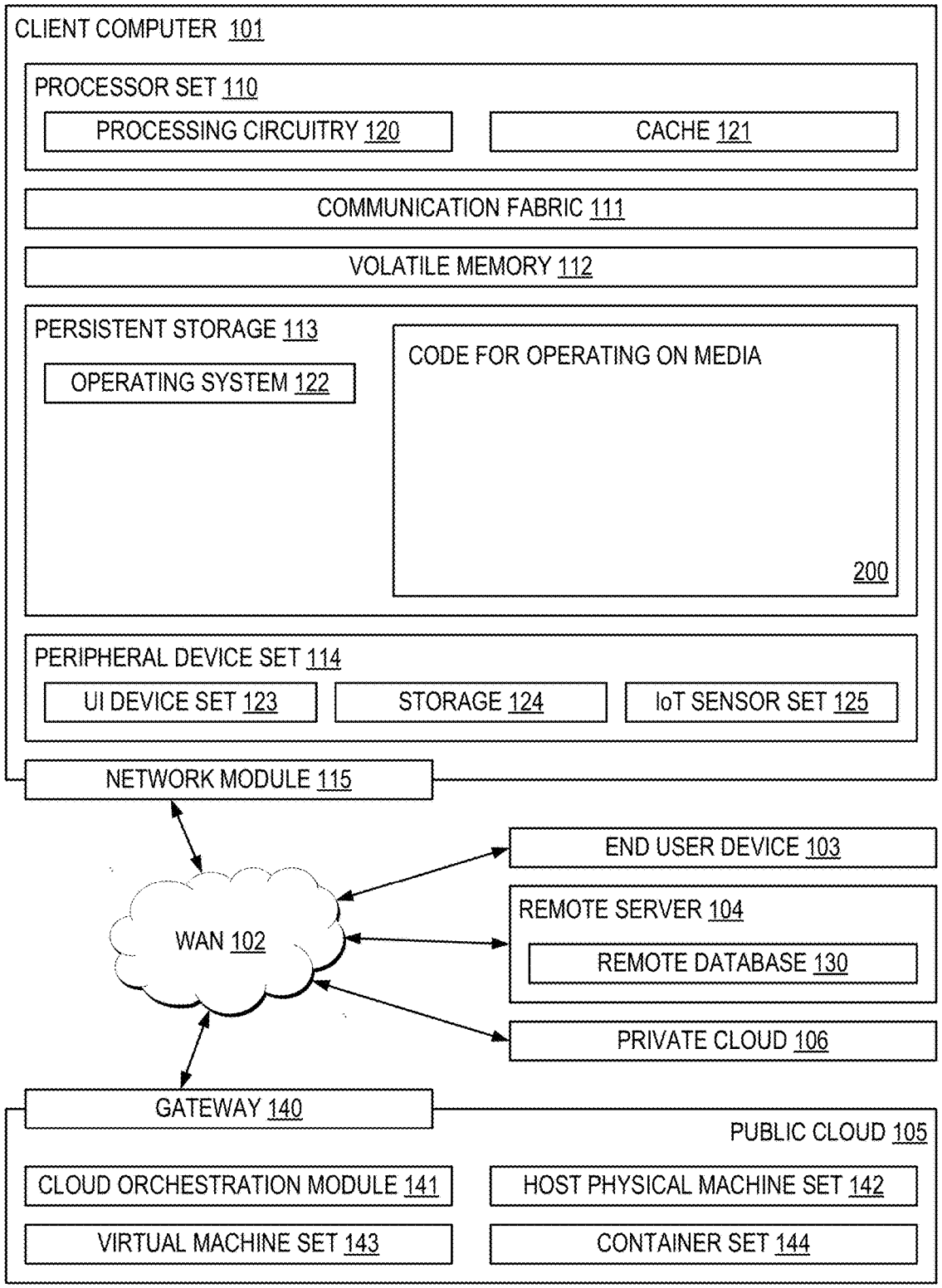
FIG. 1 is a diagram of a computing environment, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred aspects of magnetic storage systems, as well as operation and/or component parts thereof. Various approaches enable the use of a given media format across products using different read/write head designs. In preferred approaches, media reuse is enabled in part by overwriting a portion of the servo pattern for products that are not designed for the particular format of the media.

A method, in accordance with one aspect of the present invention, includes writing, by a tape drive, data tracks to a data band of a magnetic tape having servo bands flanking the data band, the writing being performed using a magnetic head that is not designed for a format of the magnetic tape. An effective pitch of servo readers of the magnetic head used simultaneously during the writing matches a servo reader pitch specification of the format of the magnetic tape. An average effective pitch of write transducers of the magnetic head is greater than a data track pitch specification of the format of the magnetic tape. The greater effective pitch of the write transducers allows more data tracks to be written to a given area of the magnetic tape. This generally corresponds to the ability to store more data on the tape. Moreover, the present method allows use of a tape having a given media format by a drive having a head that is not configured to operate with that format, thereby allowing reuse of tape media with products not designed for use with said format.

In one approach, the servo bands are not overwritten with data tracks during the writing. This preserves the servo bands.

In one approach, a portion of each of the servo bands is overwritten with data tracks during the writing. This method allows more data to be stored on a tape than the specification would otherwise allow, by using space on the magnetic tape that was previously occupied by the servo band.

In one approach, centerlines of the portions of the servo bands used during the writing are original centerlines of the servo bands. This feature has the technical effect of retaining the original centerlines of the servo bands.

In one approach, the magnetic head has at least two servo readers positioned on one side of an array of magnetic write transducers and at least two servo readers positioned on an opposite side of the array of magnetic write transducers. The tape drive is configured to use a first one of the servo readers positioned on each side of the array for writing data tracks in a first portion of the data band and to use a second one of the servo readers positioned on each side of the array for writing data tracks in a second portion of the data band. This aspect enables use of one set of servo readers for one portion of the data operations on a given data band and another set of servo readers for another portion of the data operations on the same data band. Because the servo band is overwritten, this feature allows proper positioning using a thinner servo band.

In one approach, centerlines of the portions of the servo bands used during the writing are offset from original centerlines of the servo bands. This may allow inclusion of even more data bands, and thus more data storage, by shifting the new center lines away from their original position.

An apparatus, in accordance with one approach, such as a tape drive, includes a drive mechanism for passing a magnetic tape over a magnetic head, and a controller electrically coupled to the magnetic head. The controller is configured to cause the magnetic head to write data tracks to a data band of a magnetic tape having servo bands flanking the data band. The magnetic head is not designed for a format of the magnetic tape. An effective pitch of servo readers of the magnetic head used simultaneously during the writing matches a servo reader pitch specification of the format of the magnetic tape. An average effective pitch of write transducers of the magnetic head is greater than a data track pitch specification of the format of the magnetic tape. The greater effective pitch of the write transducers allows more data tracks to be written to a given area of the magnetic tape. This generally corresponds to the ability to store more data on the tape.

In one approach, the servo bands are not overwritten with data tracks during the writing. This preserves the servo bands.

In one approach, a portion of each of the servo bands is overwritten with data tracks during the writing. This method allows more data to be stored on a tape than the specification would otherwise allow, by using space on the magnetic tape previously dedicated to the servo band.

In one approach, centerlines of the portions of the servo bands used during the writing are original centerlines of the servo bands. This feature has the technical effect of retaining the original centerlines of the servo bands.

In one approach, the magnetic head has at least two servo readers positioned on one side of an array of magnetic write transducers and at least two servo readers positioned on an opposite side of the array of magnetic write transducers. The tape drive is configured to use a first one of the servo readers positioned on each side of the array for writing data tracks in a first portion of the data band and to use a second one of the servo readers positioned on each side of the array for writing data tracks in a second portion of the data band. This aspect enables use of one set of servo readers for one portion of the data operations on a given data band and another set of servo readers for another portion of the data operations on the same data band. Because the servo band is overwritten, this feature allows proper positioning using a thinner servo band.

In one approach, centerlines of the portions of the servo bands used during the writing are offset from original centerlines of the servo bands. This may allow inclusion of even more data bands, and thus more data storage, by shifting the new center lines away from their original position.

A computer program product for enabling use of a magnetic tape by a tape drive not designed for a format of the magnetic tape, in accordance with one aspect of the present invention, includes a computer readable storage medium having program instructions embodied therewith. The program instructions are executable by the tape drive to cause the tape drive to perform any combination of steps from the foregoing methodology. The advantages and technical effects of the computer program product are similar to those set forth above for said methodology.

A method, in accordance with one aspect of the present invention, includes writing, by a tape drive, data tracks to a data band of a magnetic tape having servo bands flanking the data band, the writing being performed using a magnetic head that is not designed for a format of the magnetic tape. An effective pitch of servo readers of the magnetic head used simultaneously during the writing does not match a servo reader pitch specification of the format of the magnetic tape. An average effective pitch of write transducers of the magnetic head is greater than a data track pitch specification of the format of the magnetic tape. The greater effective pitch of the write transducers allows more data tracks to be written to a given area of the magnetic tape, e.g., in a data band. This generally corresponds to the ability to store more data on the tape.

In one approach, the servo bands are not overwritten with data tracks during the writing. This preserves the servo bands.

In one approach, a portion of each of the servo bands is overwritten with data tracks during the writing. This method allows more data to be stored on a tape than the specification would otherwise allow, by using space on the magnetic tape that was previously occupied by the servo band.

In one approach, the magnetic head has at least two servo readers positioned on one side of an array of magnetic write transducers and at least two servo readers positioned on an opposite side of the array of magnetic write transducers. The tape drive is configured to use a first one of the servo readers positioned on each side of the array for writing data tracks in a first portion of the data band and to use a second one of the servo readers positioned on each side of the array for writing data tracks in a second portion of the data band. This aspect enables use of one set of servo readers for one portion of the data operations on a given data band and another set of servo readers for another portion of the data operations on the same data band. Because the servo band is overwritten, this feature allows proper positioning using a thinner servo band.

In one approach, centerlines of the portions of the servo bands used during the writing are offset from original centerlines of the servo bands. This may allow inclusion of even more data bands, and thus more data storage, by shifting the new center lines away from their original position.

In one approach, the effective pitch of the servo readers of the magnetic head used simultaneously during the writing is less than the servo reader pitch specification of the format of the magnetic tape. This feature is particularly useful where the centerlines of the portions of the servo bands used during the writing are offset from original centerlines of the servo bands.

In one approach, one of the servo bands is completely overwritten with data tracks during the writing. This aspect greatly increases the number of data tracks that may be written by using the space that was once occupied by the overwritten servo band or bands.

In the foregoing approach, an effective pitch of servo readers of the magnetic head used simultaneously during the writing may be greater than a width of two of the data bands on the magnetic tape. This enables overwrite of an intermediary servo band positioned between the servo bands being used.

In another aspect of the foregoing approach, the magnetic head has at least two servo readers positioned on one side of an array of magnetic write transducers and at least two servo readers positioned on an opposite side of the array of magnetic write transducers, and the tape drive is configured to use a first one of the servo readers positioned on each side of the array for writing a first set of the data tracks and to use a second one of the servo readers positioned on each side of the array for writing a second set of data tracks. This aspect enables use of one set of servo readers for one portion of the data operations and another set of servo readers for another portion of the data operations, and so on, thereby enabling indexing of the write transducer array all the way across both former data bands.

A computer program product for enabling use of a magnetic tape by a tape drive not designed for a format of the magnetic tape, in accordance with one aspect of the present invention, includes a computer readable storage medium having program instructions embodied therewith. The program instructions are executable by the tape drive to cause the tape drive to perform any combination of steps from the foregoing methodology. The advantages and technical effects of the computer program product are similar to those set forth above for said methodology.

An apparatus, in accordance with one aspect of the present invention, includes a drive mechanism for passing a magnetic tape over a magnetic head, and a controller electrically coupled to the magnetic head, the controller being configured to perform any combination of steps from the foregoing methodology. The advantages and technical effects of the apparatus are similar to those set forth above for said methodology.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code in block 200 for operating on media for which a tape drive of the computing environment 100 was not designed. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2A:
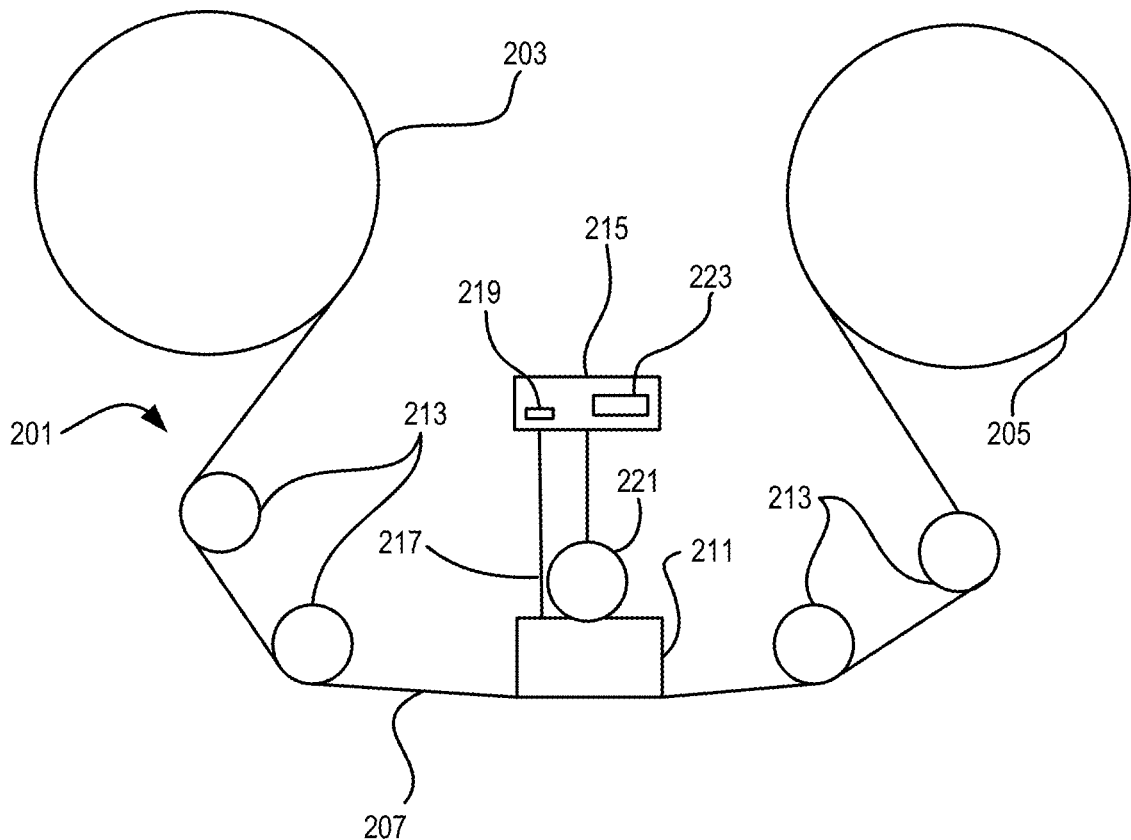
FIG. 2A is a schematic diagram of a simplified tape drive system, in accordance with one aspect.

FIG. 2A illustrates a simplified tape drive 201 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 203 and a take-up reel 205 are provided to support a tape 207. One or more of the reels may form part of a removable cartridge and are not necessarily part of the tape drive 201. The tape drive, such as that illustrated in FIG. 2A, may further include drive motor(s) to drive the tape supply cartridge 203 and the take-up reel 205 to move the tape 207 over a tape head 211 of any type. Such head may include an array of read transducers (also referred to as readers), write transducers (also known in the art as writers), or both.

Guides 213 guide the tape 207 across the tape head 211. Such tape head 211 is in turn coupled to a controller 215 via a cable 217. The controller 215, may be or include a processor and/or any logic for controlling any subsystem of the drive 201. For example, the controller 215 typically controls head functions such as servo following, data writing, data reading, etc. The controller 215 may include at least one servo channel and at least one data channel, each of which include data flow processing logic configured to process and/or store information to be written to and/or read from the tape 207. The controller 215 may operate under logic known in the art, as well as any logic disclosed herein, and thus may be considered as a processor for any of the descriptions of tape drives included herein, in various approaches. The controller 215 may be coupled to a memory 219 of any known type, which may store instructions executable by the controller 215. Moreover, the controller 215 may be configured and/or programmable to perform or control some or all of the methodologies presented herein. Thus, the controller 215 may be considered to be configured to perform various operations by way of logic programmed into one or more chips, modules, and/or blocks; software, firmware, and/or other instructions being available to one or more processors; etc., and combinations thereof.

The cable 217 may include read/write circuits to transmit data to the tape head 211 to be recorded on the tape 207 and to receive data read by the tape head 211 from the tape 207. An actuator 221 controls position of the tape head 211 relative to the tape 207.

An interface 223 may also be provided for communication between the tape drive 201 and a host (internal or external) to send and receive the data and for controlling the operation of the tape drive 201 and communicating the status of the tape drive 201 to the host, all as will be understood by those of skill in the art.

Figure 2B:
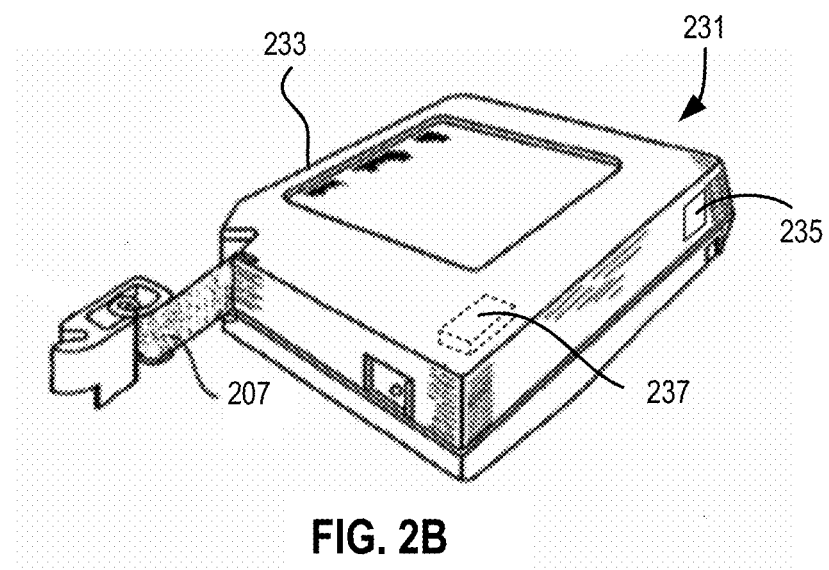
FIG. 2B is a schematic diagram of a tape cartridge, in accordance with one aspect.

FIG. 2B illustrates an exemplary tape cartridge 231, according to one aspect of the present invention. Such tape cartridge 231 may be used with a system such as that shown in FIG. 2A. As shown, the tape cartridge 231 includes a housing 233, a tape 207 in the housing 233, and a nonvolatile memory 237 coupled to the housing 233. In some approaches, the nonvolatile memory 237 may be embedded inside the housing 233, as shown in FIG. 2B. In more approaches, the nonvolatile memory 237 may be attached to the inside or outside of the housing 233 without modification of the housing 233. For example, the nonvolatile memory may be embedded in a self-adhesive label 235. In one preferred approach, the nonvolatile memory 237 may be a Flash memory device, read-only memory (ROM) device, etc., embedded into or coupled to the inside or outside of the tape cartridge 231. The nonvolatile memory is accessible by the tape drive and the tape operating software (the driver software), and/or another device.

Figure 2C:
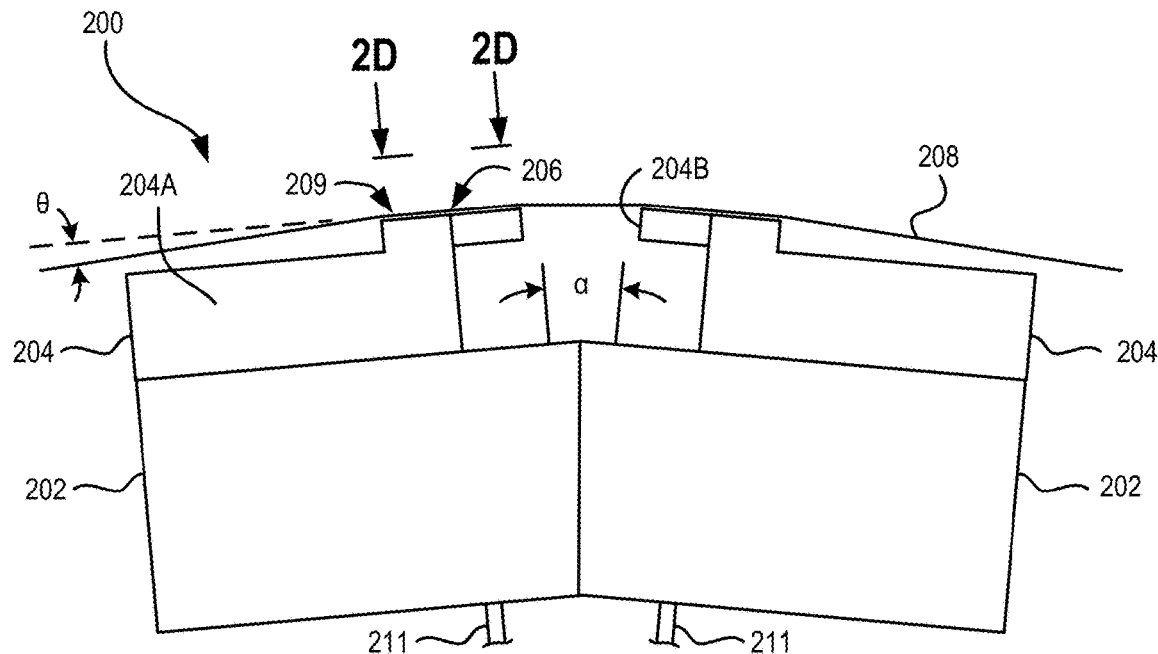
FIG. 2C illustrates a side view of a flat-lapped, bi-directional, two-module magnetic tape head, in accordance with one aspect.

By way of example, FIG. 2C illustrates a side view of a flat-lapped, bi-directional, two-module magnetic tape head 211 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 217 are provided for enabling communication between the controller and the transducers 206 of each of the modules 204. Pads on a cable 217 are typically wire bonded to pads on the associated module 204.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2D:
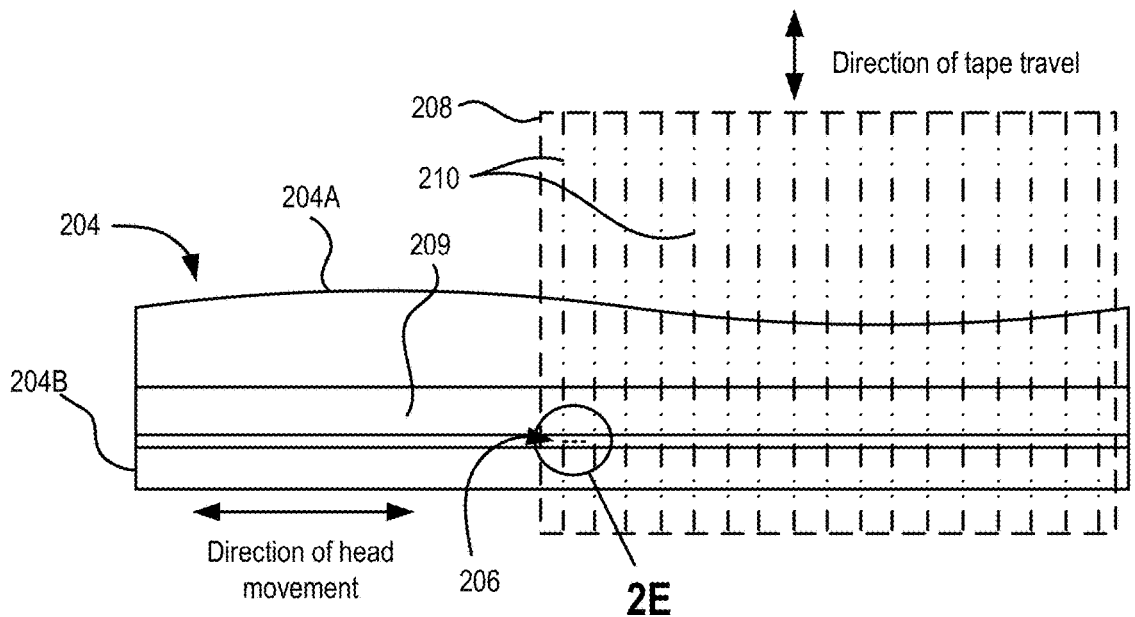
FIG. 2D is a tape bearing surface view taken from Line 2D of FIG. 2C.

FIG. 2D illustrates the tape bearing surface 209 of one of the modules 204 taken from Line 2D of FIG. 2C. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2D on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2E:
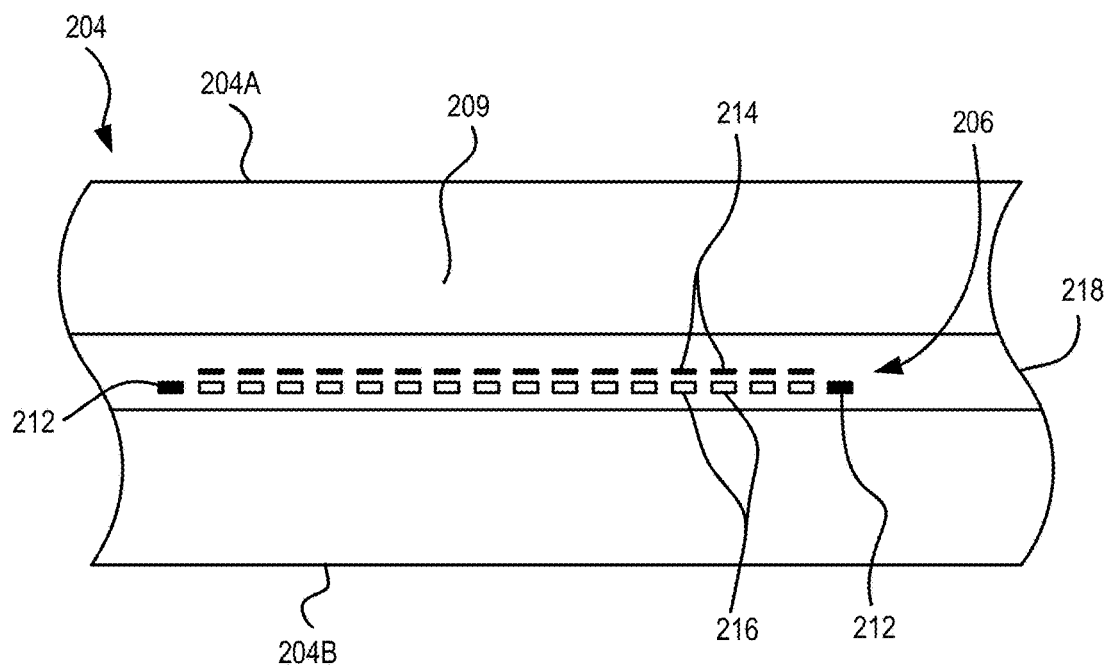
FIG. 2E is a detailed view taken from Circle 2E of FIG. 2D.

FIG. 2E depicts a plurality of read transducers and/or write transducers 206 formed in a gap 218 on the module 204 in Circle 2E of FIG. 2D. As shown in FIG. 2E, the array of read transducers and write transducers 206 includes, for example, 16 write transducers 214, 16 read transducers 216 and two servo readers 212, though the number of elements may vary. Illustrative approaches include 8, 16, 32, 40, and 64 active read transducers and/or write transducers 206 per array, and alternatively interleaved designs having odd numbers of read transducers or write transducers such as 17, 25, 33, etc. An illustrative approach includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2E, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2C and 2D-2E together, each module 204 may include a complementary set of read transducers and/or write transducers 206 for such things as bi-directional reading and writing, read-while-write capability, backward compatibility, etc.

Figure 2F:
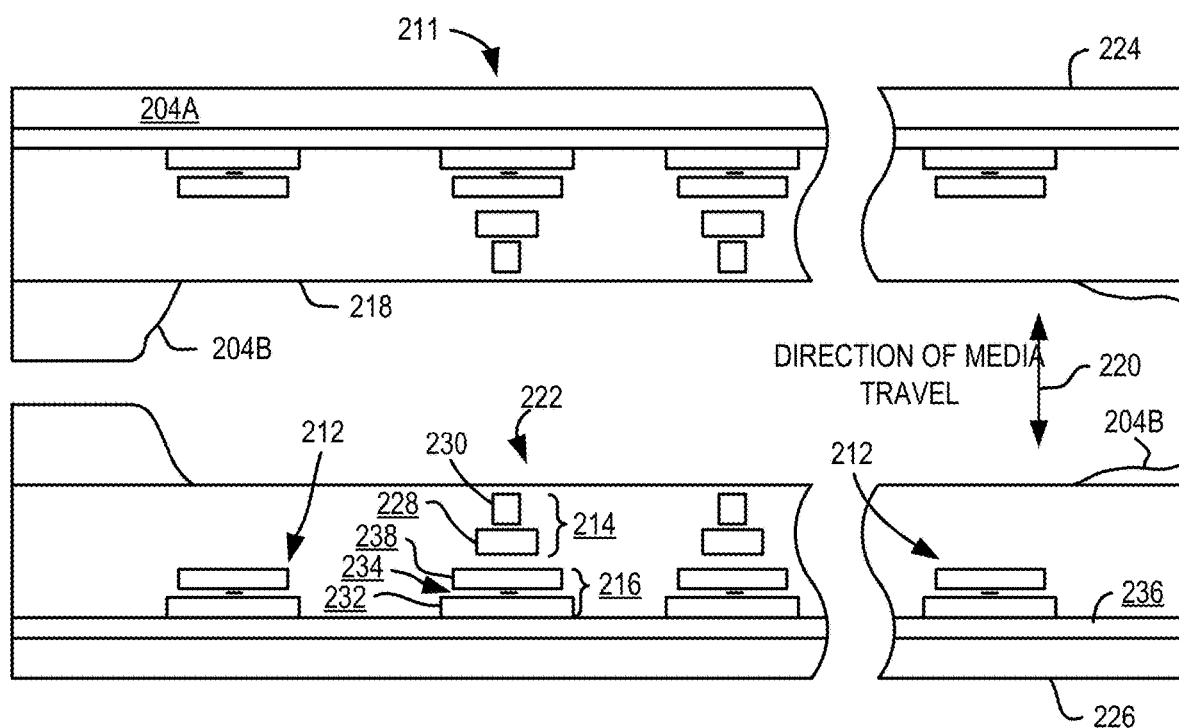
FIG. 2F is a detailed view of a partial tape bearing surface of a pair of modules.

FIG. 2F shows a partial tape bearing surface view of complementary modules of a magnetic tape head 211, according to one approach. In this approach, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 211 operate in a transducing relationship in the manner well-known in the art. The head assembly 211 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 211 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
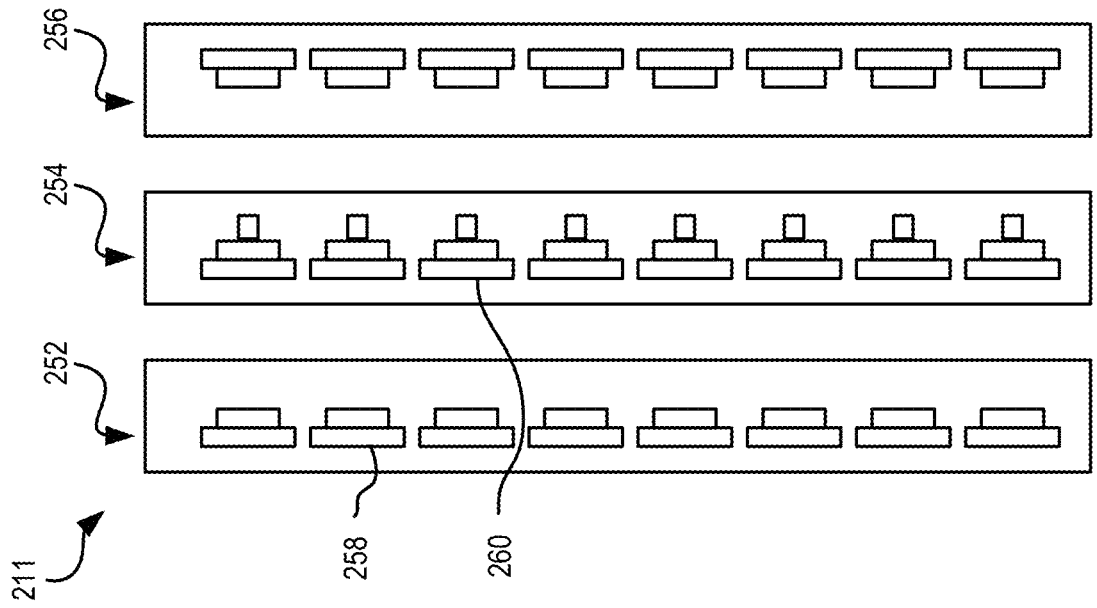
FIG. 4 is a partial tape bearing surface view of a magnetic head having a read-write-read configuration, in accordance with one aspect.
Figure 3:
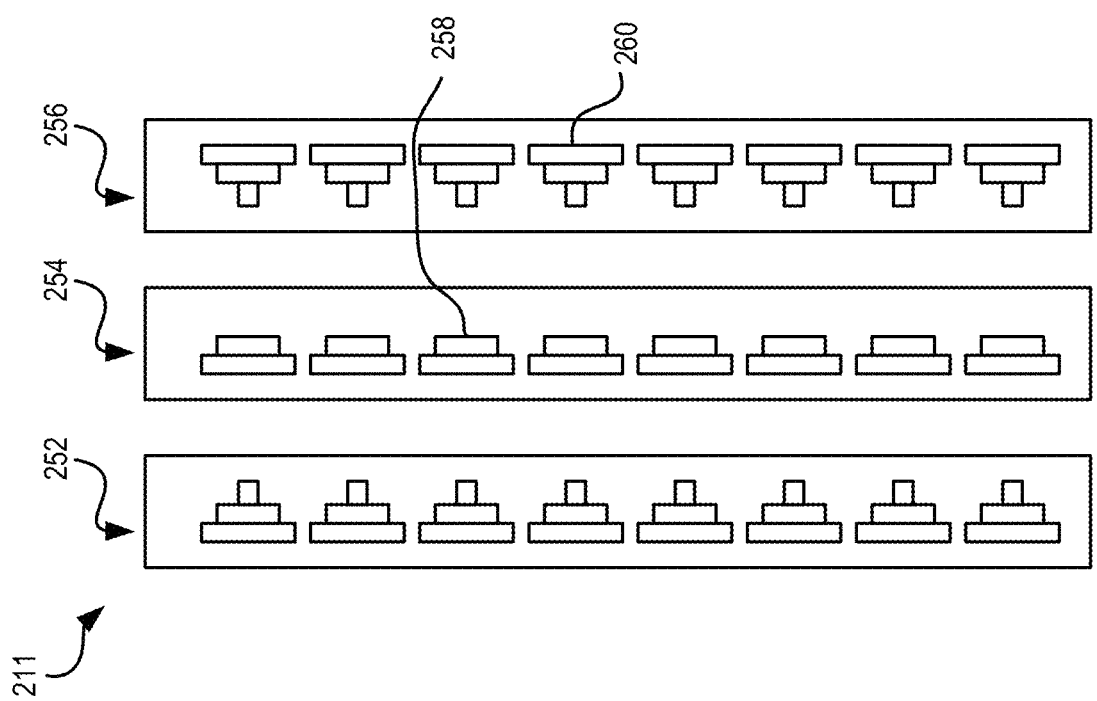
FIG. 3 is a partial tape bearing surface view of a magnetic head having a write-read-write configuration, in accordance with one aspect.

The configuration of the tape head 211, according to one approach, includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches of the present invention. One skilled in the art apprised with the teachings herein will appreciate how permutations of the present invention would apply to configurations other than a W-R-W configuration.

Figure 5:
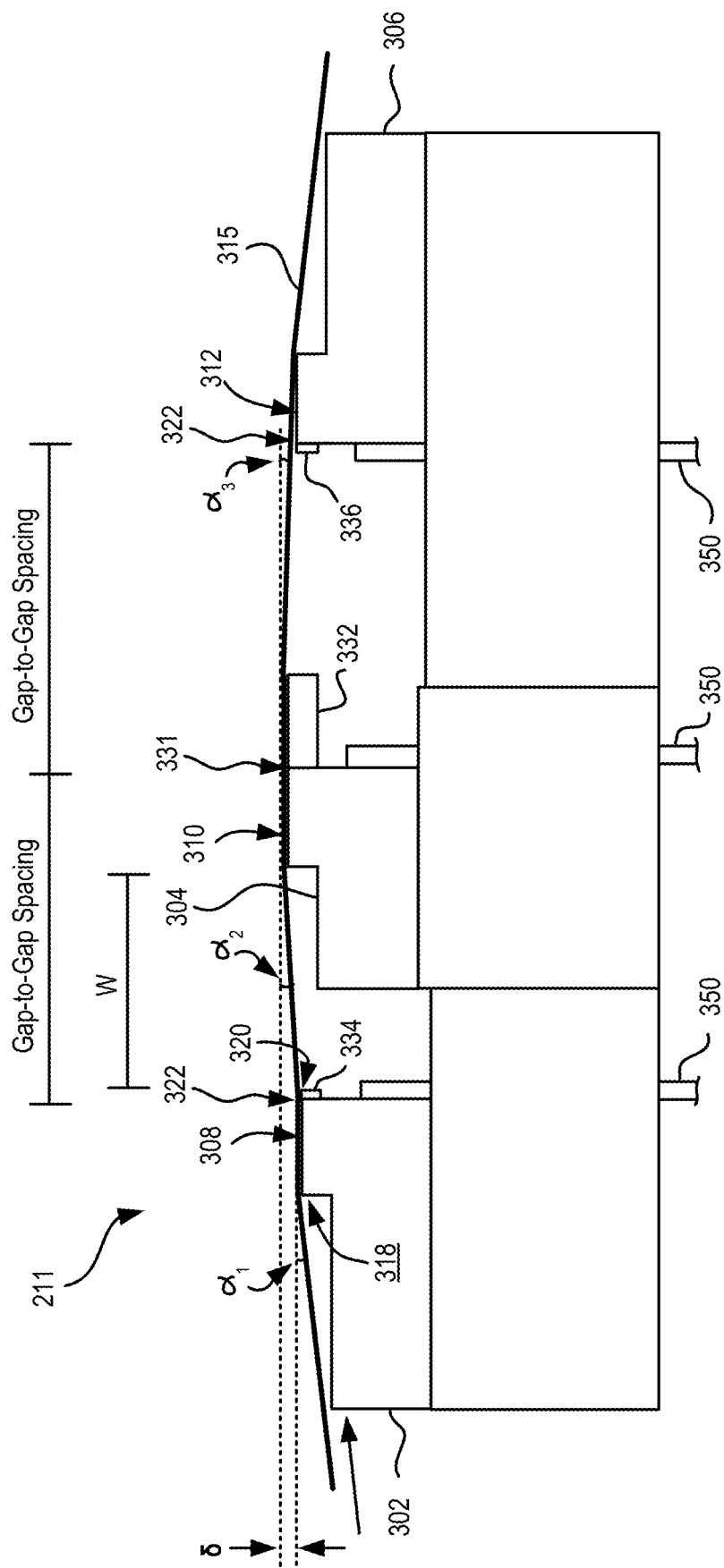
FIG. 5 is a side view of a magnetic tape head with three modules where the modules all generally lie along about parallel planes, in accordance with one aspect.

FIG. 5 illustrates a magnetic head 211 according to one aspect of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
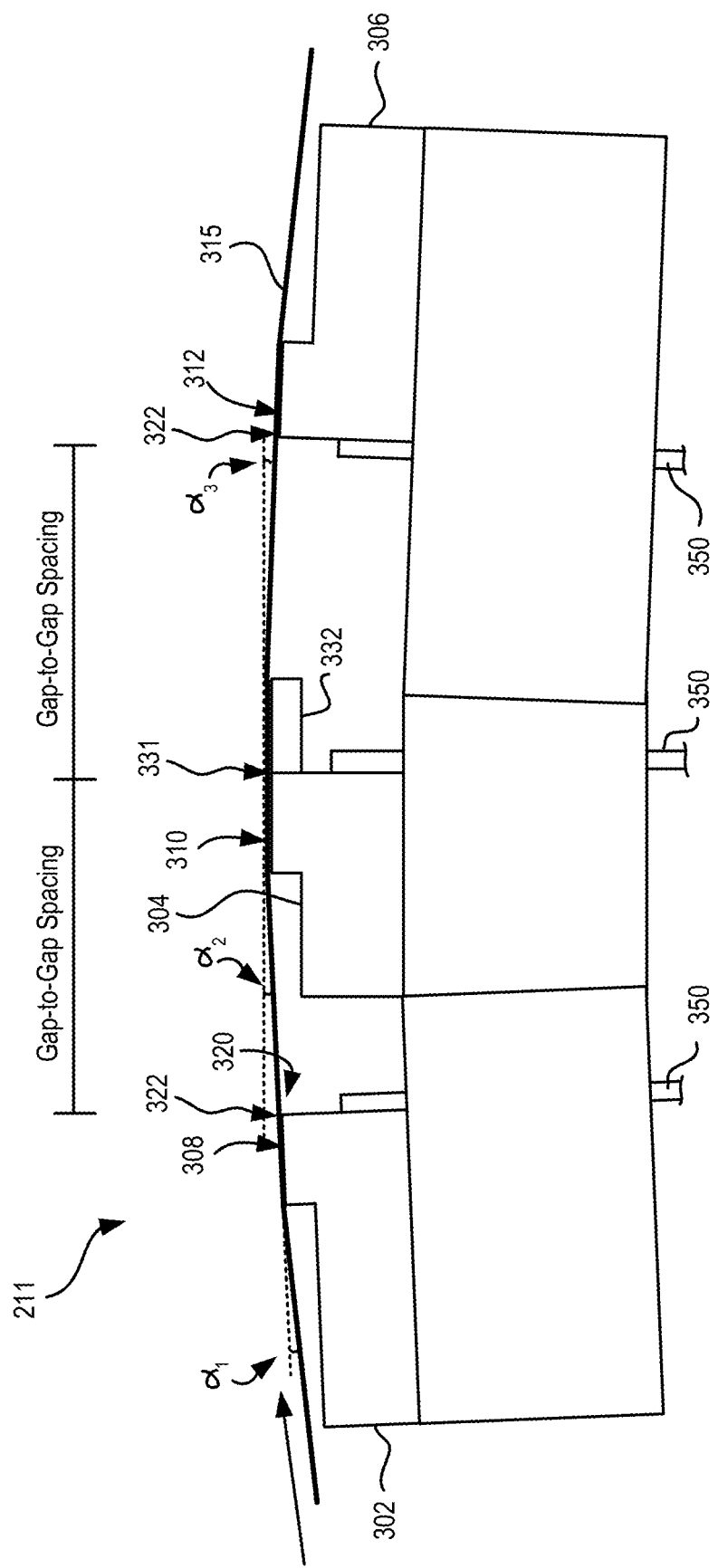
FIG. 6 is a side view of a magnetic tape head with three modules in a tangent (angled) configuration, in accordance with one aspect.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These approaches are particularly adapted for write-read-write applications.

A benefit of this and other approaches described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the approach shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Depending on tape tension and stiffness, it may be desirable to angle the tape bearing surfaces of the outer modules relative to the tape bearing surface of the second module. FIG. 6 illustrates an approach where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the approaches shown in FIGS. 5 and 6.

Figure 7:
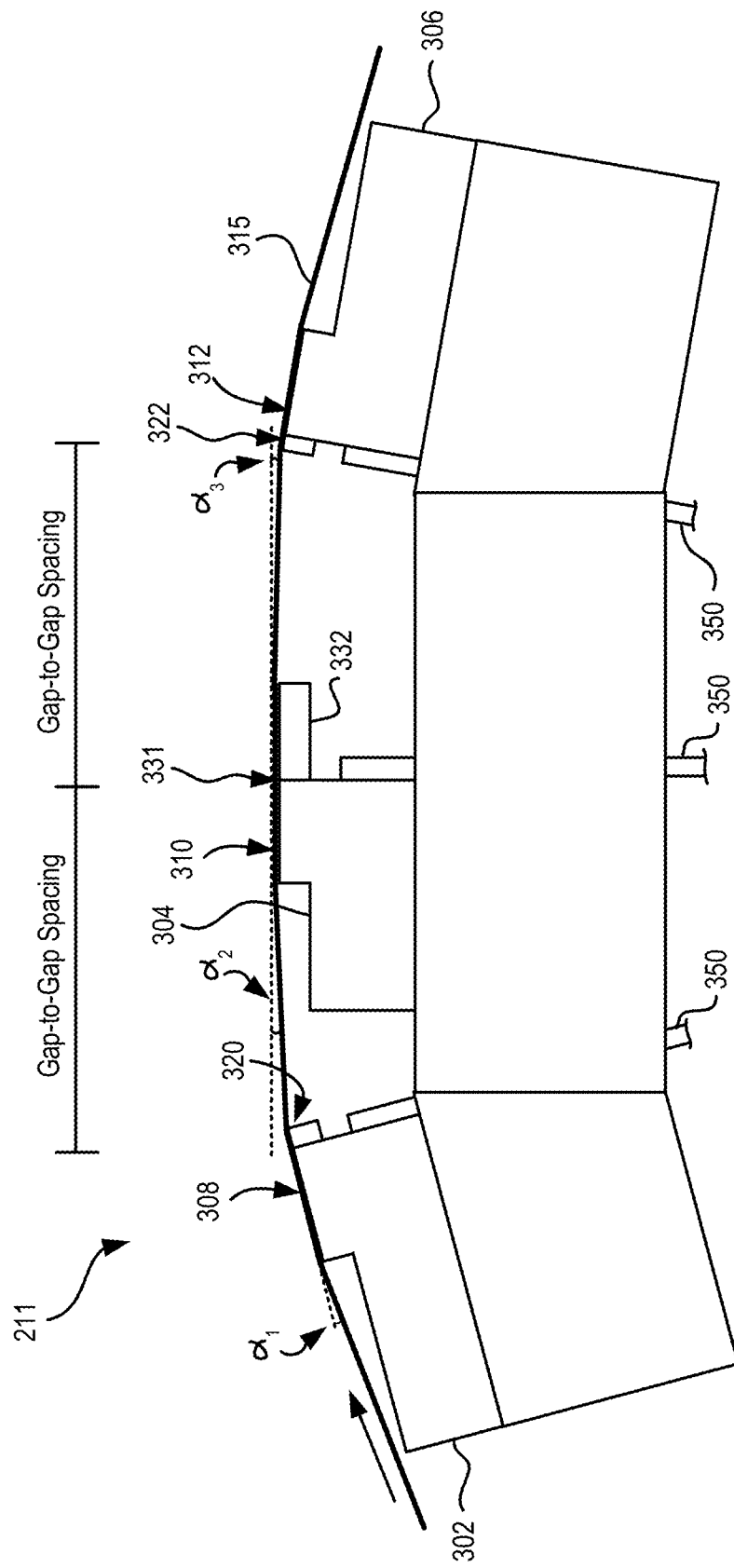
FIG. 7 is a side view of a magnetic tape head with three modules in an overwrap configuration.

FIG. 7 illustrates an approach where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this approach, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach has a write-read-write configuration, which may use shortened closures that thus allow closer gap-to-gap separation.

Additional aspects of the approaches shown in FIGS. 6 and 7 are similar to those given above.

A 32 channel version of a multi-module tape head 211 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various approaches in conformance with the teachings herein, as would become apparent to one skilled in the art upon reading the present disclosure.

Figure 8A:
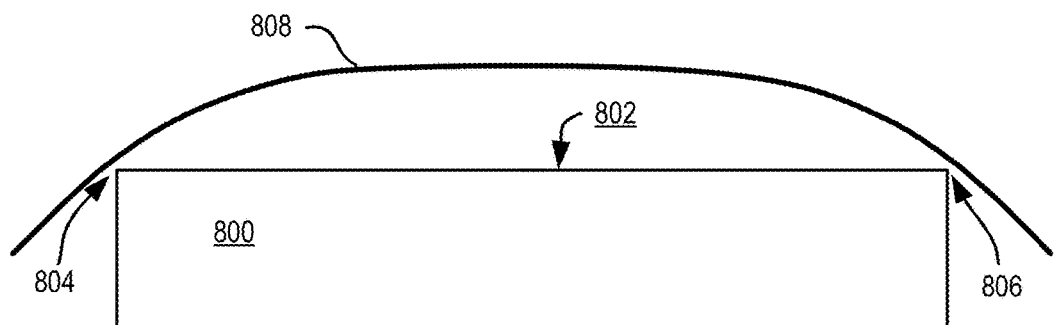
FIGS. 8A-8C are schematics depicting the principles of tape tenting.
Figure 8B:
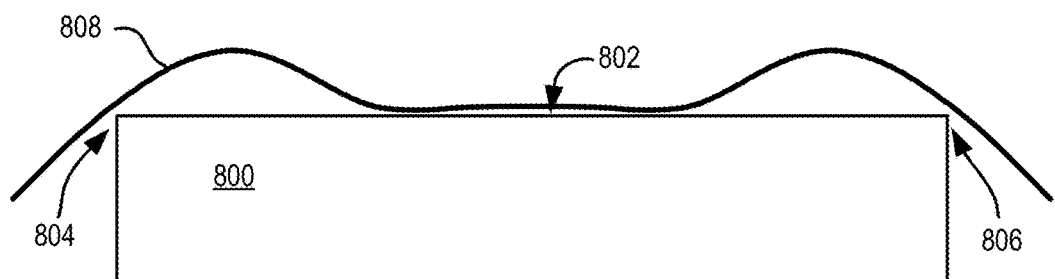
Figure 8C:
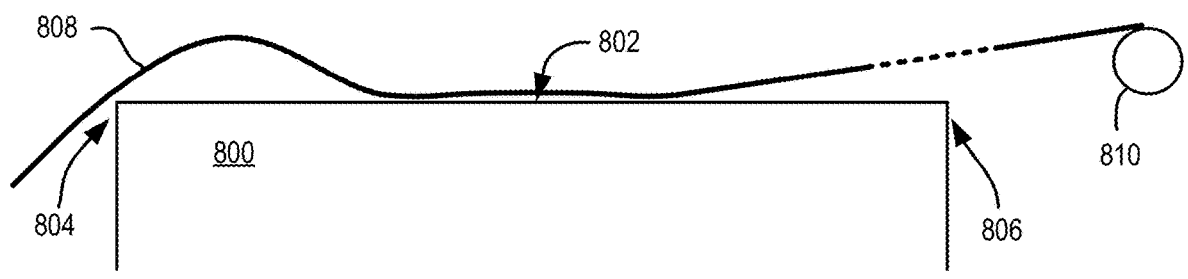

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes (also referred to as tapes, magnetic recording tapes, tape media, and the like) may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enable access to compliant tapes. It should be appreciated that various approaches herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the approaches below may be described with reference to LTFS, which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 205 of FIG. 2A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
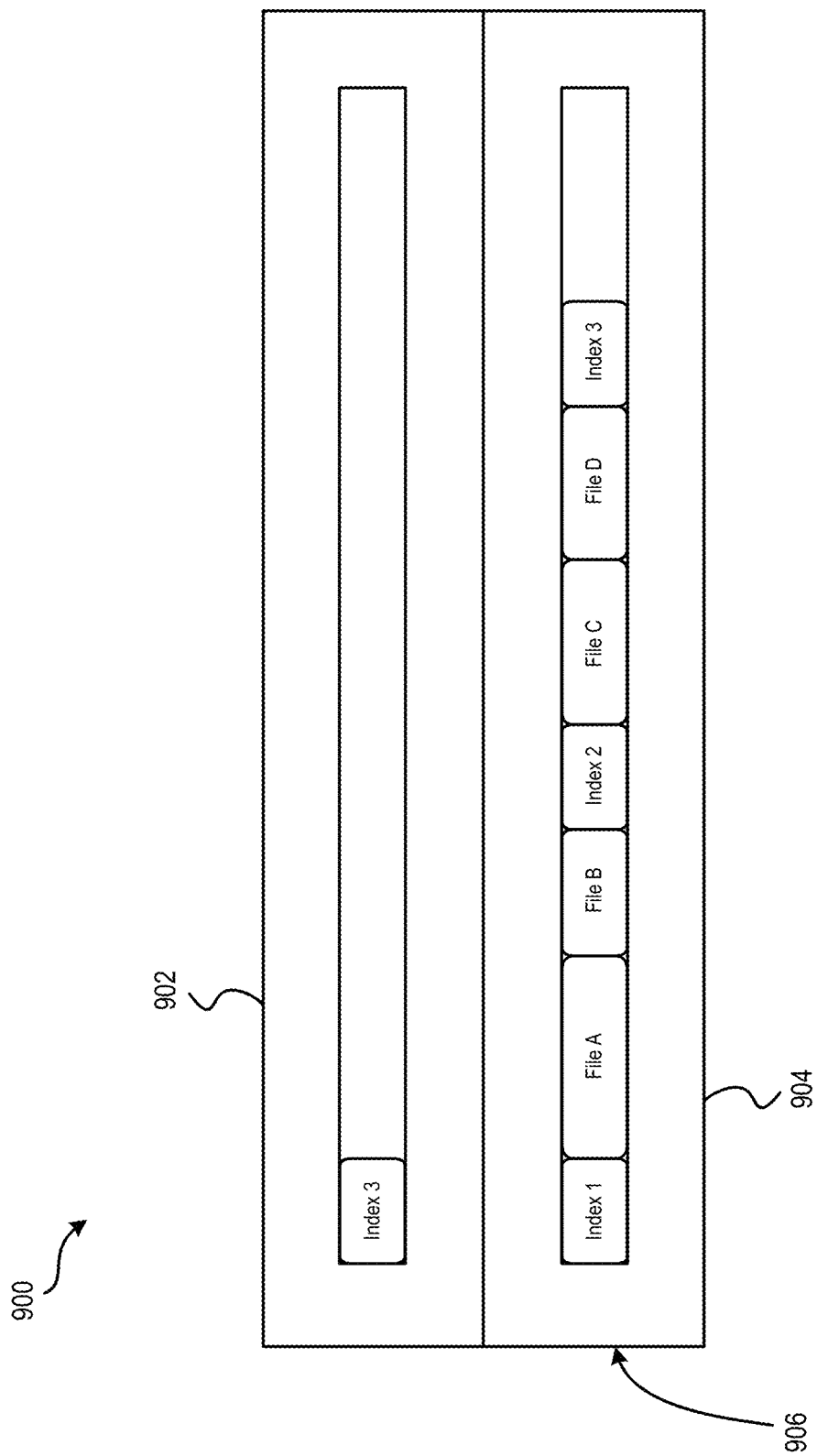
FIG. 9 is a representational diagram of files and indexes stored on a magnetic tape, in accordance with one aspect.

Looking to FIG. 9, a magnetic tape 900 having an index partition 902 and a data partition 904 is illustrated, according to one approach. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three versions of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired approach. According to some approaches, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As mentioned above, magnetic tape is generally compliant with some predefined format, such as LTO 9, LTO 10, etc. A format may specify servo track spacing, guard band location, number of tracks, and so on. Magnetic heads are designed to comply with a particular format (or formats e.g., via reverse compatibility). Formats are generally available in the literature, and therefore readily available to interested parties. Various approaches described herein may correspond to extant formats, modified versions of extant formats created according to the teachings herein, and/or creation of a new format that could be, in relevant part, specified by one skilled in the art after being apprised of the present disclosure and the teachings herein.

Servo bands compliant with the desired format are written on the magnetic tape at the factory to ensure precise positioning of the servo tracks within the servo bands under ideal conditions to ensure consistency of the servo pattern, proper and consistent spacing, and to minimize the detrimental effects of tape lateral expansion and contraction. Moreover, servo tracks are not written by customer tape drives due to a variety of reasons, such as the inherent variability between writer spacing from module to module and drive to drive, the inability to ensure optimal conditions that avoid tape lateral expansion or contraction, and so on, as would be apparent to unskilled in the art. Indeed, customer-level tape drives do not typically have built-in capabilities to write servo tracks, e.g., they do not have servo writers. It bears mention that some tape drives are able to write High Definition (HD) servo tracks that supplement the prewritten data band. The present disclosure is directed to servo bands prewritten on magnetic tapes according to a particular format.

Figure 10:
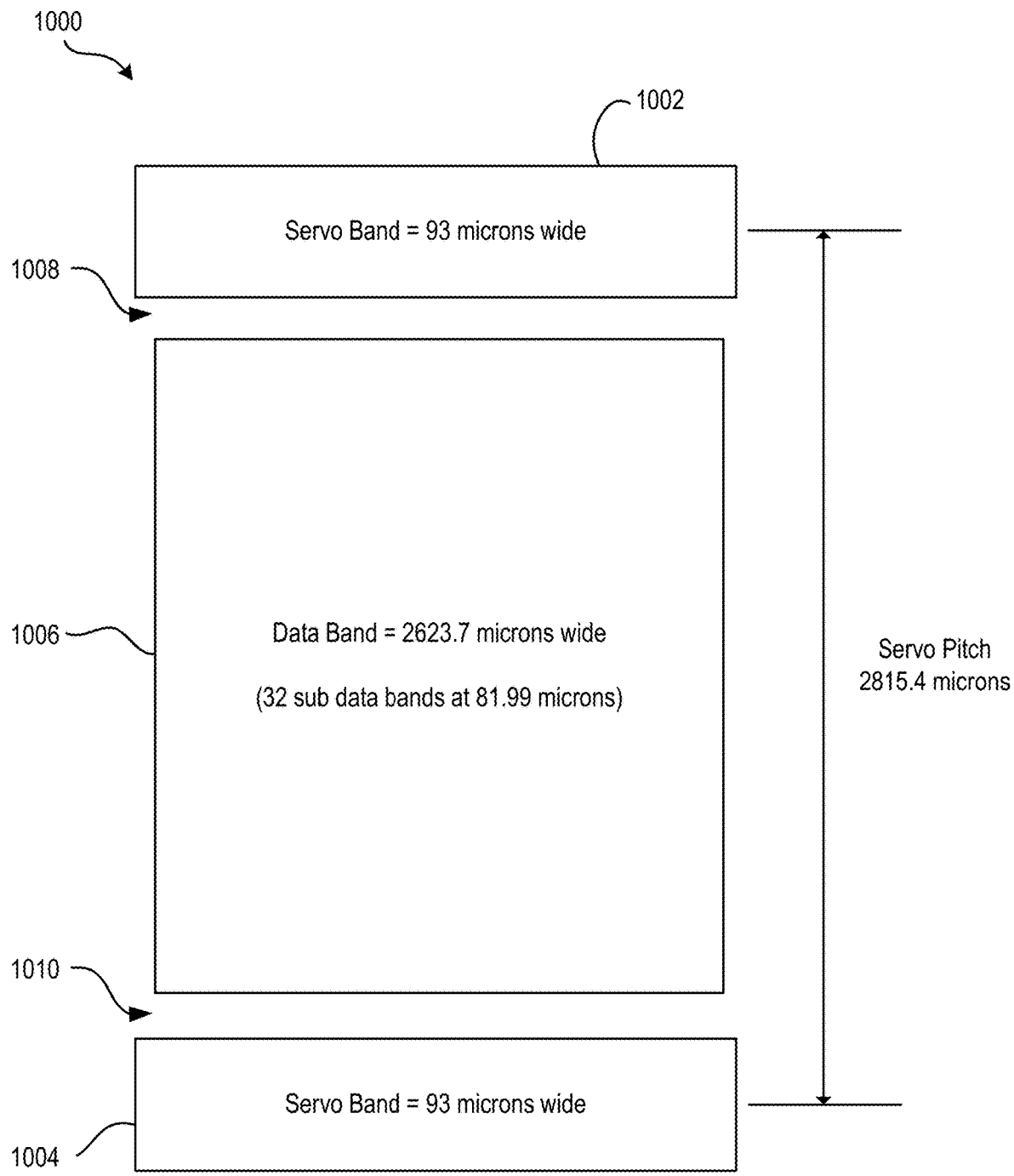
FIG. 10 is a partial representative view of a magnetic tape formatted according to the LTO 10 format.

It follows that the servo tracks prewritten on a magnetic tape are used throughout the life of the magnetic tape. Conventional wisdom has been to protect the servo tracks from overwrite to ensure their integrity, as damage to the servo tracks may render data on the tape unreadable. Accordingly, as shown in FIG. 10, which is a partial representative view of a magnetic tape 1000 factory-formatted according to the LTO 10 format having two factory-written servo bands 1002, 1004 (three other servo bands not shown) flanking a data band area 1006. Unwritable guard bands 1008, 1010 are specified as being positioned between the data band area 1006 and each servo band 1002, 1004 adjacent thereto. The guard bands 1008, 1010 are areas on the tape which are not written to, as specified by the format, to protect the servo bands 1002, 1004 from accidental overwrite.

Given that servo bands compliant with a predefined format are prewritten onto the magnetic tape typically at the magnetic tape factory, prior to the present invention, only tape drives designed to operate with the predefined format directly or via backward compatibility have been able to write data to a magnetic tape. Tape drives not designed to operate with the format of the tape have heretofore not been able to write to such a magnetic tape using the servo tracks of the prewritten servo bands. The servo bands may have any type of known timing based servo pattern therein.

There has therefore been a need to extend the use magnetic tapes formatted for a given media format across noncompliant products using different read/write head designs.

Figure 11:
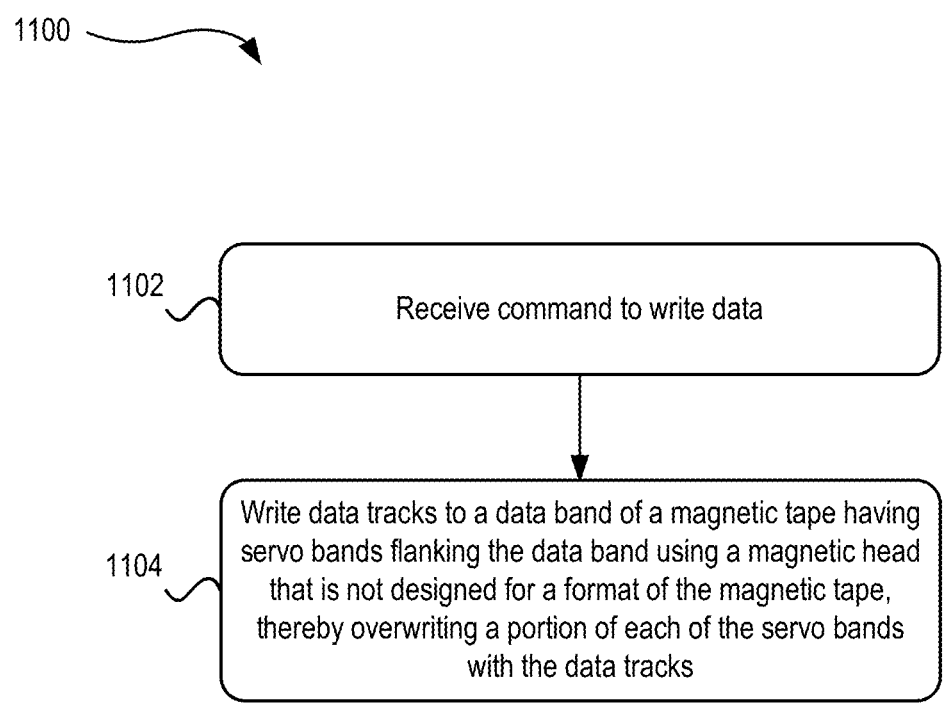
FIG. 11 is a flowchart of a method, in accordance with one approach.

Now referring to FIG. 11, a flowchart of a method 1100 for enabling reuse of magnetic recording tape media with products not designed for the format of the tape media is shown according to one approach. The method 1100 may be performed in accordance with the present invention in any of the environments depicted in FIGS. 1-10, among others, in various approaches. Of course, more, or fewer operations than those specifically described in FIG. 11 may be included in method 1100, as would be understood by one of skill in the art upon reading the present descriptions.

Each of the steps of the method 1100 may be performed by any suitable component of the operating environment. For example, in various approaches, the method 1100 may be partially or entirely performed by a tape drive, a tape library, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 includes operation 1102, where a tape drive receives a command to write data.

In operation 1104, the tape drive writes data tracks to a data band of a magnetic tape having servo bands flanking the data band. The tape drive may be of conventional design, except that writing is performed using a magnetic head that is not designed for, e.g., compliant with, a format of the magnetic tape. For example, the layout, pitch (center-to-center spacing), etc. of the magnetic write transducers of the head may be different than a head configured to write tracks having a pitch specified by the format to thereby write data tracks at a different pitch than specified by the format, would write to areas such as guard bands that are specified as unwritable by the format, etc.

The writing includes overwriting a portion of each of the servo bands with the data tracks. As mentioned above, it has conventionally been considered unacceptable to overwrite any portion of a prewritten servo band with data. For this reason, the aforementioned guard bands are specified by all relevant tape formats to protect the servo bands. Accordingly, this method 1100 proceeds contrary to conventional wisdom, thereby enabling tape drive products not designed for the particular format of the tape to not only write to the magnetic tape, but in fact use more area of the tape for writing data, thereby potentially increasing the amount of data storable on the tape. Moreover, because the data is written in the format for which the tape drive is configured, the same drive or another drive configured in the format of the drive can read the data from the magnetic tape.

Figure 12:
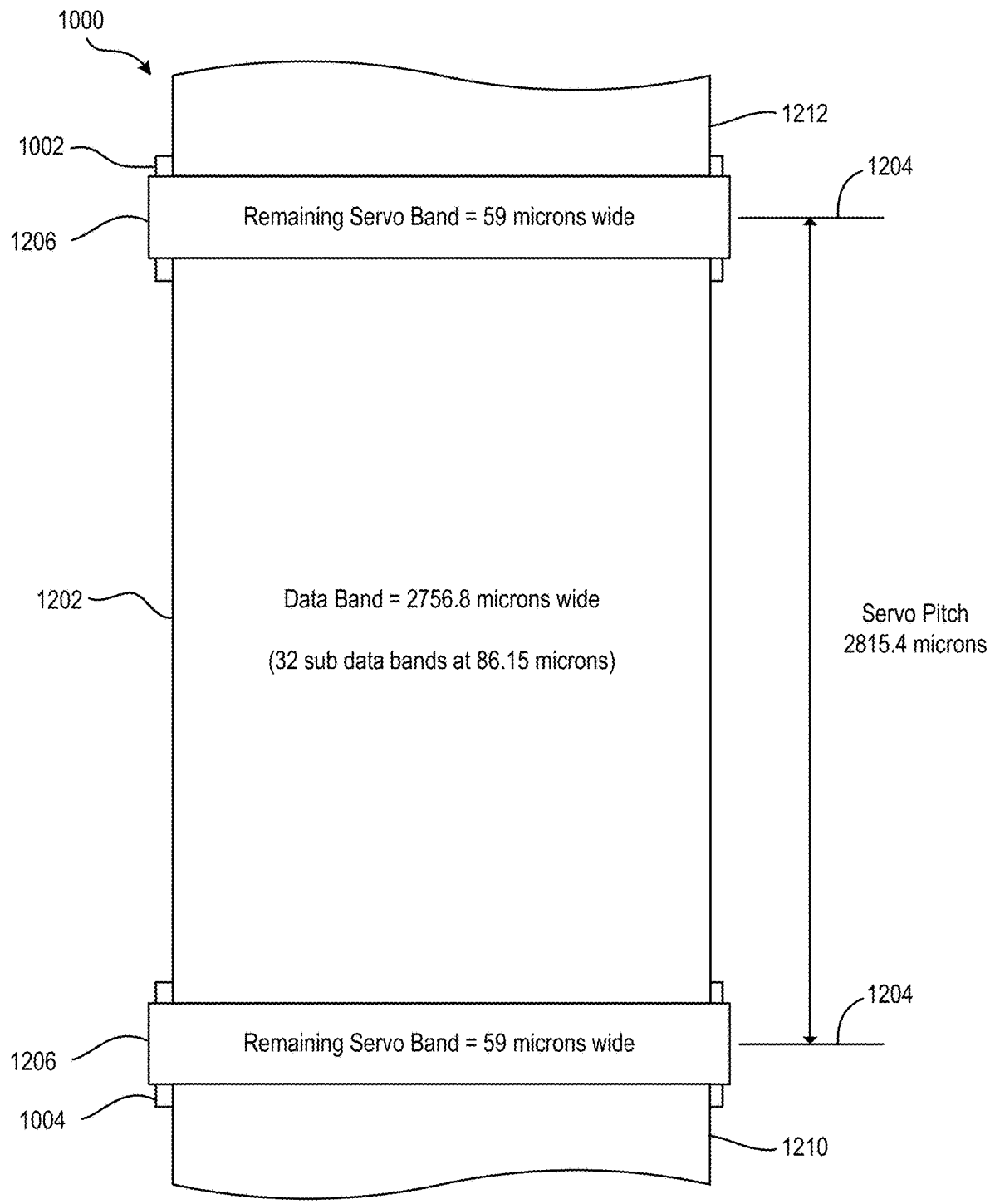
FIG. 12 is a partial representative view of a magnetic tape having two prewritten servo bands, in accordance with one approach.

FIG. 12 is a partial representative view of a magnetic tape 1000 having two prewritten servo bands 1002, 1004 (other servo bands not shown). As shown, upon performing the method 1100 of FIG. 11 with a tape drive that is not compliant with LTO 10, the resulting data band 1202 extends into one or both of the servo bands 1002, 1004.

As shown in FIG. 12, centerlines 1204 of the portions 1206 of the servo bands used during the writing are original centerlines of the servo bands, where the original centerlines extend along a longitudinal axis of the recording tape and are each located at a lateral midpoint of the respective original servo band 1002, 1004. Note that each "original" servo band 1002, 1004 is the servo band in its original width for the format for which intended, before being overwritten. To exemplify the remaining servo band, data bands 1210, 1212 written according to the method 1100 of FIG. 11 are also shown above and below.

As described in more detail below, the drive that is not designed for the format of the tape may have one servo reader on each side of the array of write transducers, or more than one servo reader on each side of the array of write transducers. In one approach, the effective (center-to-center)

pitch of a pair of the servo readers of the magnetic head used simultaneously during the writing matches a servo reader pitch specification of the format of the magnetic tape.

An "effective pitch," as used herein refers to the pitch as measured perpendicular to the direction of tape travel. Thus, on the tape, the effective pitch of the servo bands is the actual pitch of the servo bands, while the effective pitch of the data tracks is the actual pitch of the data tracks. On a non-tilted head, the effective pitch of the servo readers is the actual pitch of the servo readers. On a tilted head, the effective pitch of the servo readers is less than the actual pitch of the servo readers. Similarly, on a tilted head, the effective pitch of the read or write transducers is less than the actual pitch of the transducers. The pitch specified by a format generally refers to the effective pitch. Thus, for example, a transducer pitch specified by a format can be considered to be the pitch that provides an effective transducer pitch to match the data track pitch specified by the format. Likewise, a servo reader pitch specified by a format can be considered to be the pitch that provides the effective servo reader pitch that matches the servo reader pitch specified by the format. Examples are provided below.

In one specific example, the servo readers that are simultaneously used during the writing (e.g., one servo reader on each servo band) may have a pitch approximating that specified in LTO 10 (e.g., 2815.4 microns), or if the head is tilted, an actual pitch that causes the lateral distance (effective pitch) between the servo readers as measured perpendicular to the direction of tape travel thereacross to match the effective pitch specified in LTO 10 (e.g., 2815.4 microns) at the nominal tilt angle.

In one approach, the magnetic head has one servo reader positioned on one side of the array of magnetic write transducers and one servo reader positioned on an opposite side of the array of magnetic write transducers on the same module. See, e.g., servo readers 212 of FIG. 2E. In this approach, the pair of servo readers is used to position the writers during all writing within a given data band.

In another approach, the magnetic head has at least two servo readers positioned on one side of the array of magnetic write transducers and at least two servo readers positioned on an opposite side of the array of magnetic write transducers on the same module. For example, each side of the array in FIG. 2E may have two or more servo readers 212, e.g., groups of two or more servo readers positioned adjacent one another along the cross-track direction, one group on each side of the array of write transducers, and preferably generally aligned therewith in the cross-track direction. The tape drive is configured to use a first one of the servo readers positioned on each side of the array for writing data tracks in a first portion of the data band and to use a second one of the servo readers positioned on each side of the array for writing data tracks in a second portion of the data band that is different than the first portion. Thus, for instance, the pair of first servo readers may be used to write data tracks starting at a lowermost lateral location of the write transducers in the data band on the magnetic tape. As data tracks are written, the first servo readers move across the respective servo band until positioning control is transitioned to use of the second servo readers to continue the writing. This feature enables more overwrite of the servo band (and thus less remaining width of the servo band) by using one pair of servo readers for part of the writing (e.g., when other pair(s) of the servo readers are not over the servo bands) and then another pair of the servo readers for another part of the writing (e.g., when the first pair of servo readers no longer overlies the servo bands).

Some approaches may have three pairs of servo readers (e.g., three servo readers on each side of the data band), four pairs, and so on. The greater the number of pairs of servo readers, the less distance across the servo bands need be traversed by a given pair of servo readers, which in turn reduces the amount of servo bands that must be retained.

In further approaches, the actual pitch, or effective pitch if on a tilted head, between pairs of servo readers used during a given writing operation may be less than the servo reader pitch specified by the format for the magnetic tape, which typically corresponds to the actual pitch of adjacent servo bands. Accordingly, centerlines of the portions of the servo bands used during the writing are offset from original centerlines of the servo bands.

Figure 13:
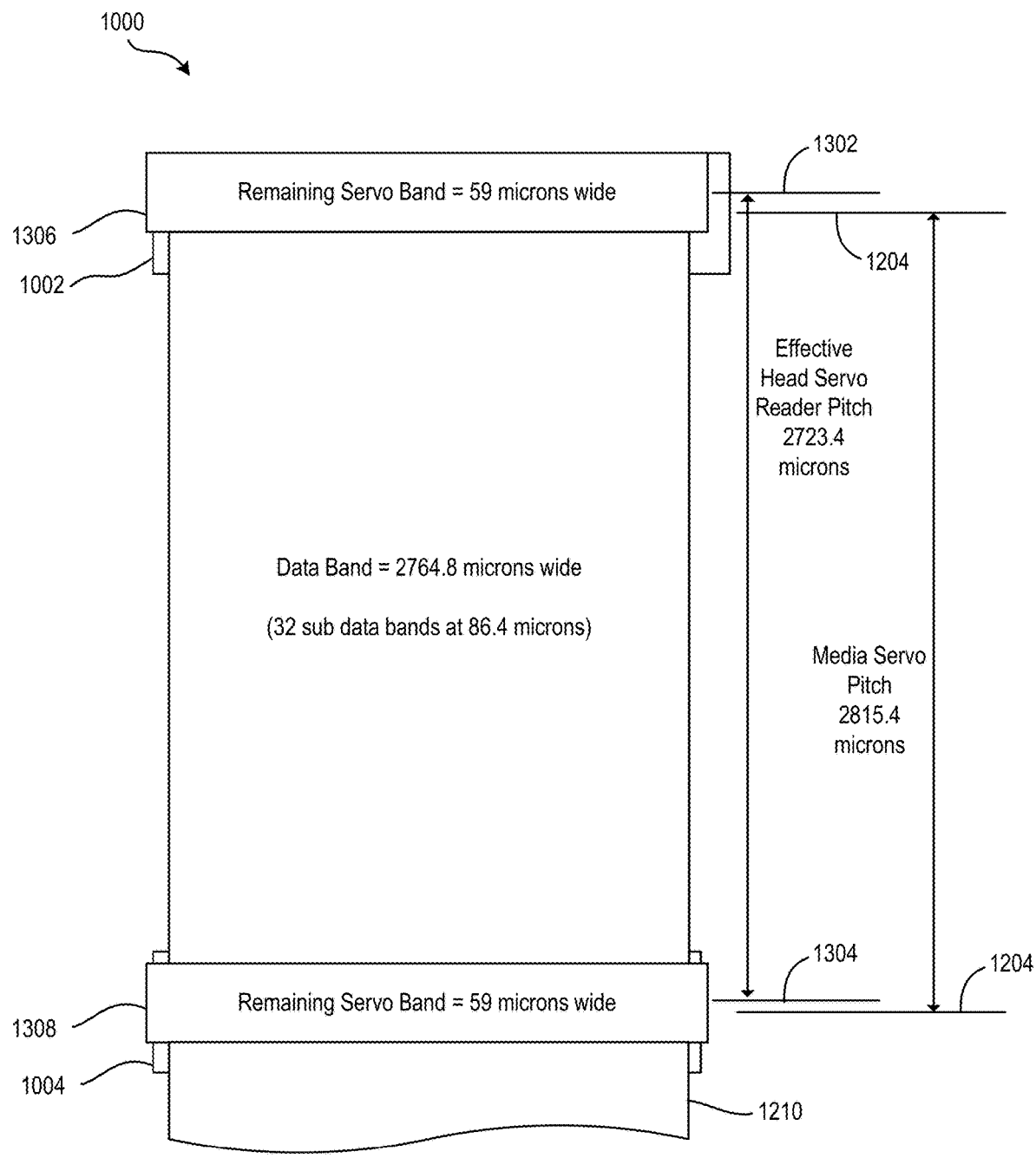
FIG. 13 is a partial representative view of a magnetic tape having two prewritten servo bands, in accordance with one approach.

In some approaches, the effective pitch of servo readers of a magnetic head used simultaneously during the writing does not match a servo reader pitch specification of the format of the magnetic tape. FIG. 13 is a partial representative view of a magnetic tape 1000 having two prewritten servo bands 1002, 1004 (other servo bands not shown). As shown, upon performing the method 1100 of FIG. 11 with a tape drive having an effective servo reader pitch (e.g., 2723.4 microns) that is less than the pitch (2815.4 microns) specified in LTO 10, the resulting data band 1202 extends into one or both of the servo bands 1002, 1004, and centerlines 1302, 1304 of the portions 1306, 1308 of the servo bands used during the writing are offset from original centerlines 1204 of the servo bands.

According to one approach, the overwrite depicted in FIGS. 12-13 may be achieved by increasing the average effective center-to-center pitch of the write transducers above the pitch specified in the format. For example, LTO 10 specifies 32 data tracks written concurrently onto tape at a pitch of 81.99 microns. The pitch of the transducers on an LTO 10-compliant head are positioned to read and write the tracks at this pitch. Thus, an exemplary on-head transducer pitch for an LTO 10-compliant head is 83.25 microns, where such head is nominally tilted at 10 degrees from perpendicular to the direction of tape travel thereacross (83.25*cos (10deg)=81.99). The pitch in the noncompliant head may be larger, e.g., 32 write transducers at a pitch of 86.15 microns, thereby causing the data band 1202 to extend into each original servo band by approximately 17 microns with the same tilt.

According to another approach, the overwrite depicted in FIGS. 12-13 may be achieved by increasing the number of active write transducers used during the writing. For example, LTO 10 specifies writing at an effective pitch of 81.99 microns, and thus specifies an on-head transducer pitch of 83.25 microns for a head having a tilt of 10°. The number of write transducers in the array of the noncompliant head may be larger, e.g., 48, 64, etc. The pitch of the write transducers in an array of the noncompliant head may be a proportional division product of the pitch specified by the format, e.g., 64 write transducers in an array positioned at one half the specification pitch of a format specifying 32 write transducers. In other approaches, the effective pitch of the write transducers in an array of the noncompliant head may be larger than the aforementioned division product.

Any other mechanism or configuration for overwriting a portion of one or both servo bands flanking a data band that would become apparent to unskilled in the art after reading the present disclosure may be used in various approaches.

Figure 14:
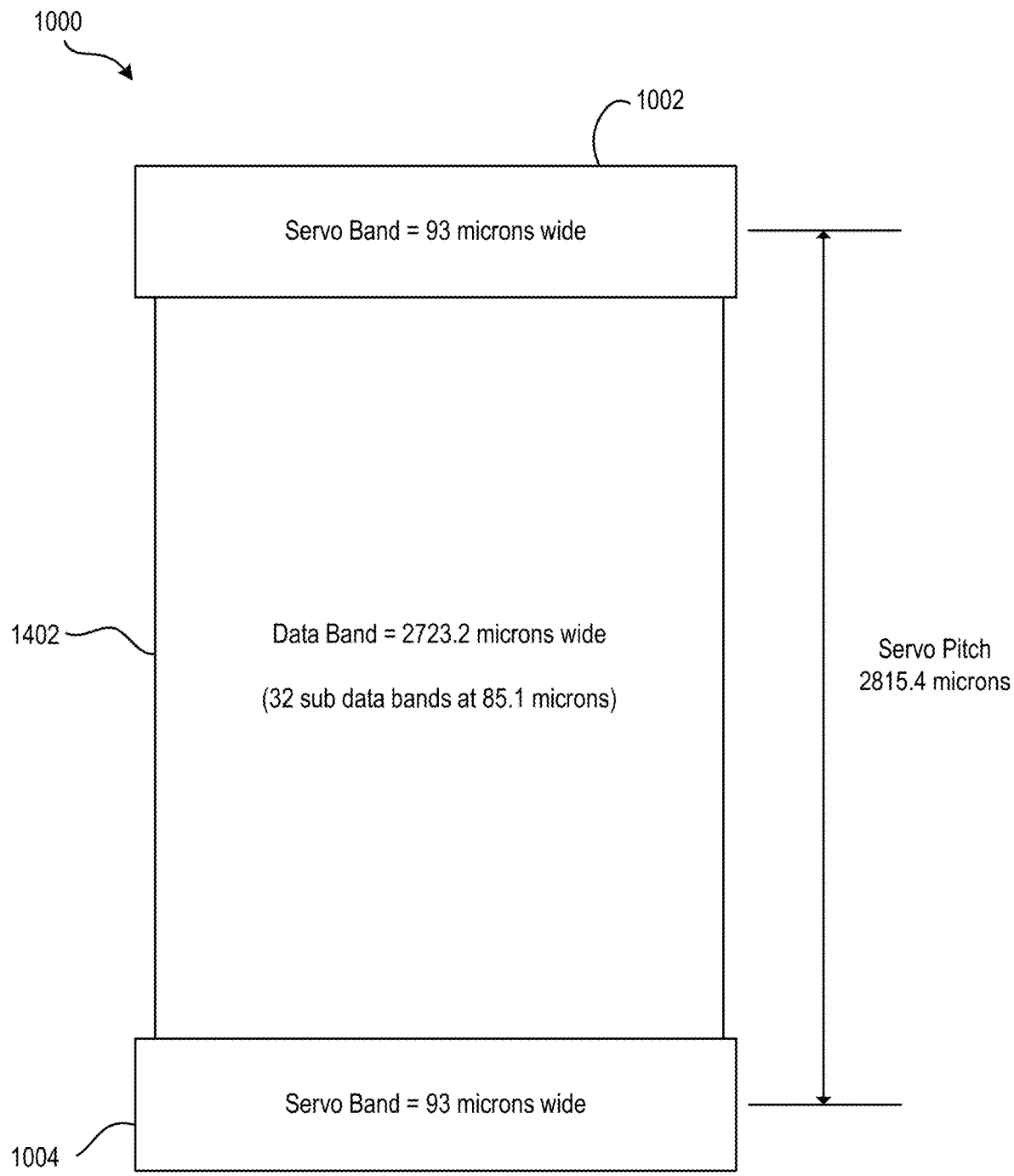
FIG. 14 is a partial representative view of a magnetic tape having two prewritten servo bands, in accordance with one approach.

In some approaches, the prewritten servo bands of a magnetic tape are not overwritten by a magnetic head that is not designed for a format of the magnetic tape, but most (e.g., at least 90%) or all of the area occupied by the guard bands specified by the format is written to. To exemplify, FIG. 14 is a partial representative view of a magnetic tape 1000 having two prewritten servo bands 1002, 1004 (other servo bands not shown). As shown, the data band 1402 extends nearly to both flanking servo bands 1002, 1004, with perhaps a small amount of unwritten area between the data band 1402 and one or both servo bands 1002, 1004.

Figure 15:
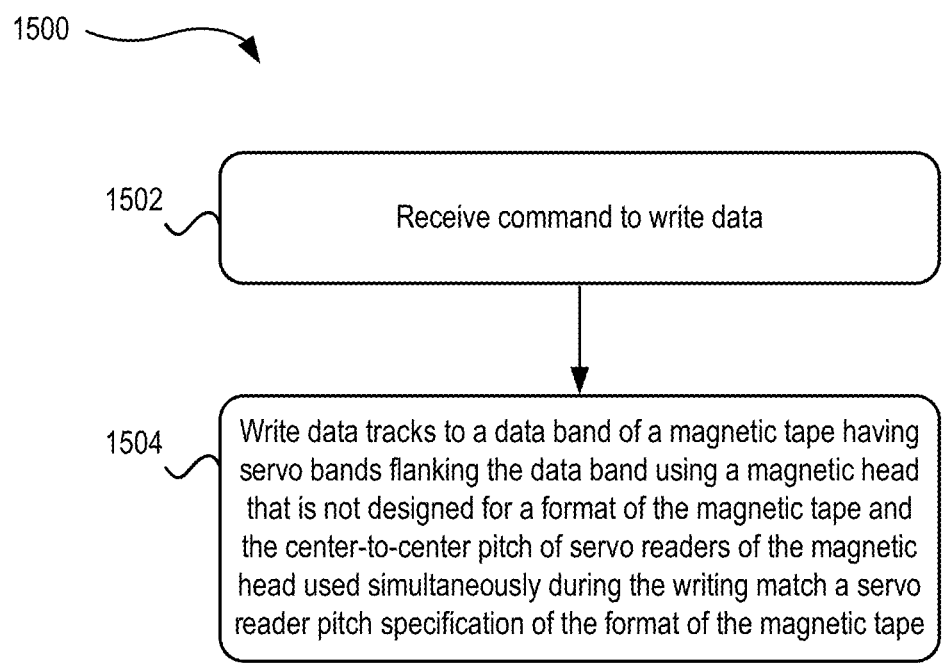
FIG. 15 is a flowchart of a method, in accordance with one approach.

Now referring to FIG. 15, a flowchart of a method 1500 for reusing recording tape media with products not designed for the format of the magnetic tape media is shown according to one approach. The method 1500 may be performed in accordance with the present invention in any of the environments depicted in FIGS. 1-14, among others, in various approaches. Of course, more, or fewer operations than those specifically described in FIG. 15 may be included in method 1500, as would be understood by one of skill in the art upon reading the present descriptions.

Each of the steps of the method 1500 may be performed by any suitable component of the operating environment. For example, in various approaches, the method 1500 may be partially or entirely performed by a tape drive, a tape library, or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 15, method 1500 includes operation 1502, where a tape drive receives a command to write data.

In operation 1504, the tape drive writes data tracks to a data band of a magnetic tape having servo bands flanking the data band, the writing being performed using a magnetic head that is not designed for a format of the magnetic tape. An effective pitch of servo readers of the magnetic head used simultaneously during the writing matches a servo reader pitch specification of the format of the magnetic tape. The servo reader pitch specification generally specifies the effective servo reader pitch to use when performing data operations on the magnetic tape. For example, the servo reader pitch specification may directly correspond to the pitch of the servo bands on the magnetic tape, e.g., the servo reader pitch specification may specify an effective servo reader pitch equal to the pitch of the servo tracks in the servo bands flanking a given data band. An average effective pitch of the write transducers of the magnetic head is greater than a data track pitch specification of the format of the magnetic tape.

In one approach, a portion of one or more of the servo bands is overwritten with data tracks during the writing, e.g., as depicted in FIGS. 12-13.

In another approach, the servo bands are not overwritten with data tracks during the writing, i.e., no part of either servo band is overwritten. For example, the resulting written area may conceptually resemble that shown in FIG. 14. The overwrite of the guard bands depicted in FIG. 14 may be achieved by increasing the average effective pitch of the write transducers to increase the pitch of the written tracks above the pitch specified in the format. The proper effective pitch to fill in all areas between the servo bands may be calculated in a manner that would become apparent to one skilled in the art after reading the present disclosure.

According to another approach, the overwrite of the guard bands depicted in FIG. 14 may be achieved due to a larger number of active write transducers used during the writing than specified by the format of the magnetic tape. For example, LTO 10 specifies 32 write transducers at an effective pitch of 81.99 microns. The number of write transducers in the array of the noncompliant head may be larger, e.g., 48, 64, etc. The effective pitch of the write transducers in an array of the noncompliant head may be a proportional division product of the data track pitch specified by the format, e.g., 64 write transducers in an array positioned at one half the specification pitch of a format specifying 32 simultaneously-written data tracks. In other approaches, the effective pitch of the write transducers in an array of the noncompliant head may be larger than the aforementioned division product.

An apparatus, in accordance with various approaches, may be a tape drive having a drive mechanism for passing a magnetic tape over a magnetic head and a controller electrically coupled to the magnetic head. The controller is configured to cause the magnetic head to write data tracks to a data band of the magnetic tape, the magnetic tape having servo bands flanking the data band, e.g., according to the method 1100 of FIG. 11. The apparatus may be configured to nominally operate with a specific tape format or formats but is also capable of writing to a magnetic tape in one mode of operation where the magnetic head is not designed for the format of the magnetic tape. The writing includes overwriting a portion of each of the servo bands with the data tracks, e.g., using any combination of the methodology presented herein.

The apparatus may include components and configurations as described elsewhere herein (see, e.g., FIGS. 2A-7, as well as configurations described with reference to FIGS. 12-14). For example, the magnetic head may have a single pair of servo readers flanking the array of write transducers, or at least two servo readers positioned on one side of the array of write transducers and at least two servo readers positioned on an opposite side of the array of write transducers on a given module. Likewise, as described above, the tape drive may be configured to use a first one of the servo readers positioned on each side of the array for writing data tracks in a first portion of the data band and to use a second one of the servo readers positioned on each side of the array for writing data tracks in a second portion of the data band that is different than the first portion.

In some approaches, centerlines of the portions of the servo bands used during the writing are original centerlines of the servo bands, where the original centerlines extend along a longitudinal axis of the recording tape and are each located at a lateral midpoint of the respective original servo band (where the original servo band is the servo band in its original width for the format for which intended, before being overwritten).

In some approaches, the effective pitch of the servo readers used simultaneously during the writing matches the effective servo reader pitch specification of the format of the magnetic tape, where an average effective pitch of write transducers of the magnetic head is greater than the data track pitch specification, and thus the effective write transducer pitch specification, of the format of the magnetic tape. In other approaches, centerlines of the portions of the servo bands used during the writing are offset from original centerlines of the servo bands.

In some approaches, an effective pitch of the servo readers used simultaneously during the writing is less than the effective servo reader pitch specification of the format of the magnetic tape, and an average effective pitch of write transducers of the magnetic head is greater than the data track pitch specification of the format of the magnetic tape.

In yet another approach, an apparatus includes a drive mechanism for passing a magnetic tape over a magnetic head, and a controller electrically coupled to the magnetic head. The controller is being configured to perform the method 1500 of FIG. 15. As noted in the description of FIG. 15, the servo bands are not overwritten with data tracks during the writing in some approaches, and in other approaches, a portion of one or more of the servo bands is overwritten with data tracks during the writing.

In further aspects of the present invention, one or more of the servo bands is completely overwritten with data tracks during writing, e.g., while performing the method 1100 of FIG. 11 or method 1500 of FIG. 15. To enable this feature, an effective pitch of the pair of servo readers used simultaneously during the writing is greater than the sum of the widths of two of the data bands on the magnetic tape.

Moreover, to enable the array of write transducers to fill in the space on the magnetic tape previously occupied by the servo band(s) being completely overwritten, multiple servo readers are preferably positioned on opposite sides of the array, and positioned on the head to enable proper servo-based positioning of the write transducers as they traverse the distance between the servo bands being used during writing. For example, the magnetic head may have at least two servo readers positioned on one side of an array of magnetic write transducers and at least two servo readers positioned on an opposite side of the array of magnetic write transducers on a same module. The tape drive is configured to use a first one of the servo readers positioned on each side of the array for writing a first set of the data tracks and to use a second one of the servo readers positioned on each side of the array for writing a second set of data tracks.

FIGS. 16-18 illustrate, by way of example, these concepts.

FIG. 16 is a representation of a servo and data band layout on a magnetic tape 1600, as specified by a format. As in the other examples, the servo bands 1602 are prewritten to the magnetic tape. The data bands 1604 are located inside of guard bands 1606 positioned adjacent each servo band 1602.

FIG. 17 illustrates the magnetic tape 1600 of FIG. 16 in which two of the servo bands 1602 are overwritten. As shown, the guard bands are also overwritten. The data bands 1702 now occupy area that is greater than two of the data bands 1604 of FIG. 16.

FIG. 18 depicts a representation of a magnetic head 1800 that wrote the data bands 1702 of FIG. 17. Two sets 1802 of at least two servo readers are positioned on either side of an array 1804 of write transducers.

The data written according to the various approaches described herein may be read back using the same tape drive, which presumably has an array of read transducers with an effective pitch approximating the effective pitch of the write transducers that wrote the data to the magnetic tape during the writing. The data may also be read back by another tape drive having an array of read transducers with an effective transducer pitch approximating the effective pitch of the write transducers that wrote the data to the magnetic tape during the writing.

Design Parameters and Examples

The following description provides further information and exemplary design implementation details usable with some or all of the foregoing aspects of the present invention. The following description includes specific examples and implementation details that are provided by way of example only and are not intended to be limiting on the appended claims.

Extant Magnetic Tape Media

Extant tape media used for data storage has several major regions: two (2) edge guard bands on either end of tape having a width $W_{Edge}$; $N_{DB}$ data bands (1 or more); and $N_{SB}=N_{DB}+1$ servo bands. No information resides in the edge guard bands. Data resides in the data bands and is written by write transducers (also referred to as write elements) and read by read transducers (also referred to as read elements). The servo bands contain pre-written information about the location of the servo element within the servo band. The servo readers read the information in the servo band and use it to determine the location of the read and write transducers within the band. The tape heads include read transducers, write transducers and servo readers. Write transducers write data to the media, read transducers read the written data, all within the data bands. Servo readers are positioned within the servo bands which are on either side of a data band. A servo band has a width, $W_{SB}$, and a data band has a width, $W_{DB}$. Excluding any buffers, the width of tape, $W_{Tape}$, is the sum of the above mentioned regions:

$$W_{Tape}=2 \cdot W_{Edge}+N_{DB} \cdot W_{DB}+N_{SB} \cdot W_{SB} \qquad 1$$

The data band width is given by:

$$W_{DB}=N_E \cdot W_{EP} \qquad 2$$

The tracks are written with a write transducer of a width $W_W$ and read by a read transducer of width $W_R$. The final tracks are separated by a track pitch distance, $W_{TP}$ which is less than $W_W$, a process termed shingled writing. A tape head has $N_E$ elements (read and write transducers) and a number or read/write channels, $N_{CH}$. $N_E$ is usually equal to $N_{CH}$ or $N_{CH}+1$. For simplicity in this discussion, assume that $N_E$ and $N_{CH}$ are equal. On a tape module, the transducers (elements) are separated by a distance, $W_{EP}$ or element pitch. Accordingly, for a single write pass of the tape, $N_E$ tracks of width $W_W$ are written and are separated by the element pitch distance, $W_{EP}$. On the next pass, the location of the write transducers is stepped over by $W_{TP}$ and another row of data is written of width $W_W$. The previously written track is partially written over, leaving data from the previous path with a width of $W_{TP}$ (shingling). Ideally (excluding buffers and physical fluctuations), then, each write transducer can write $N_{trk}$ tracks within the region spanning the element pitch minus the write transducer width:

$$(N_{trk}-1) \cdot W_{TP}=W_{EP}-W_W \qquad 3a$$

or $$N_{trk}=(W_{EP}-W_W+W_{TP})/W_{TP} \qquad 3b$$

In the simplest case, only one servo reader is placed on either end of the module, flanking the $N_E$ elements. The servo readers would then need to move across the servo band a distance equal to this motion. Ideally, (excluding buffers and physical fluctuations), when the servo reader moves across the width of the servo band ($W_{SB}$), the read transducers will move across the element pitch, being placed half a track pitch ($W_{TP}$) from either end of the element pitch. Thus, $$W_{SB}-W_S=W_{EP}-W_{TP}, \qquad 4a$$

or $$W_{SB}=W_{EP}+W_S-W_{TP}. \qquad 4b$$

This is the densest packing of the data.

The servo readers are separated from the nearest element (S1-to-E1 and S2-to-$E_{NE}$) by $W_{SE}$. In the ideal case, $W_{SE}$ is calculated in order to place the edge of the servo reader at the top of the servo band and the read transducer centered half a track pitch ($W_{TP}$) from the top of the data band:

$$W_{SE} = W_{SB} - \frac{W_S}{2} + \frac{W_{TP}}{2} \qquad 5$$

The head span from one servo reader to the next is given by:

$$W_{HeadSpan} = 2 \cdot W_{SE} + (N_E - 1) \cdot W_{EP} \qquad 6$$

The servo band-to-servo band spacing is then $W_{HeadSpan}$. Combining 1, 2 and 4b yields:

$$W_{EP} = \frac{W_{Tape} - 2 \cdot W_{Edge} - (N_{DB} + 1) \cdot (W_S - W_{TP})}{N_{DB} \cdot N_E + (N_{DB} + 1)} \qquad 7$$

Again, in the absence of buffers, the tape media and head are then designed with the parameters: $W_{Tape}$, $W_{Edge}$, $W_{SB}$, $W_{HeadSpan}$, and $N_{DB}$. The heads are designed with the parameters: $N_E$, $W_{EP}$ and $W_{SE}$. $W_W$, $W_R$ and $W_{TP}$ and can be modified to achieve the desired capacity using the base design.

The cost of the wafers used to make the read and write transducers and the cost of the servo-band writers are very high. The ability to reuse tape media designed for a given tape head design with a new tape head design greatly reduces the cost of the media.

Media Reuse

As noted in detail above, one methodology of reusing a fixed media design with a new head design is to allow overwrite of at least a portion of one or more servo bands.

One example of reusing a given magnetic tape for multiple tape head designs involves a head with twice the transducers being used for an existing tape drive and media system. One example is a tape head having 64 transducers (or channels) being used with media designed for a head with 32 channels, e.g., as specified by the format of the magnetic tape. Given a transducer pitch for the 32-channel version, $W_{EP.32}$, the head span is essentially twice the element pitch of the 64 channel version, $W_{EP.64}$. Equation 7 uses the same numerator for both 32 and 64 channel versions. The denominator is $\sim N_{DB} \cdot N_E$, to the 64-channel version will have an element pitch approximately half the value of the 32 channel version. From Equation 4b, the width of the servo band for the 64 channel version is approximately half the value of the 32 channel version:

$$W_{EP.64} \sim \frac{W_{EP.32}}{2} \qquad 8a$$

$$W_{SB.64} \sim \frac{W_{SB.32}}{2} \qquad 8b$$

In actuality, $W_{EP.64}$ may be slightly higher than given by Equation 8a to enable higher capacity and the full head span can be maintained. The same media may be used with overwriting of a portion of the servo band. The gain in usable data band is approximately the number of servo bands times half the width of $W_{EP.32}$.

Another example of overwriting a portion of the servo band includes maintaining the same number of channels but increasing the capacity by increasing the element pitch and converting from a single servo per data band to dual servo per data band. With a dual servo design, each servo may be used to write half of the data subband, which is half the element pitch. As will be shown later, in the absence of buffers, the required servo band would be:

$$W_{SB\_dual} \sim \frac{W_{EP}}{2} + W_S - W_{TP}. \qquad 8c$$

Comparing 9 to 4b, the gain in usable data band is approximately the number of servo bands times half the original transducer pitch by overwriting half the servo band. A new head design would need to be made with a wider element pitch, increasing the current element pitch to fill in the added space. The detailed equations are provided below.

Figure 19:
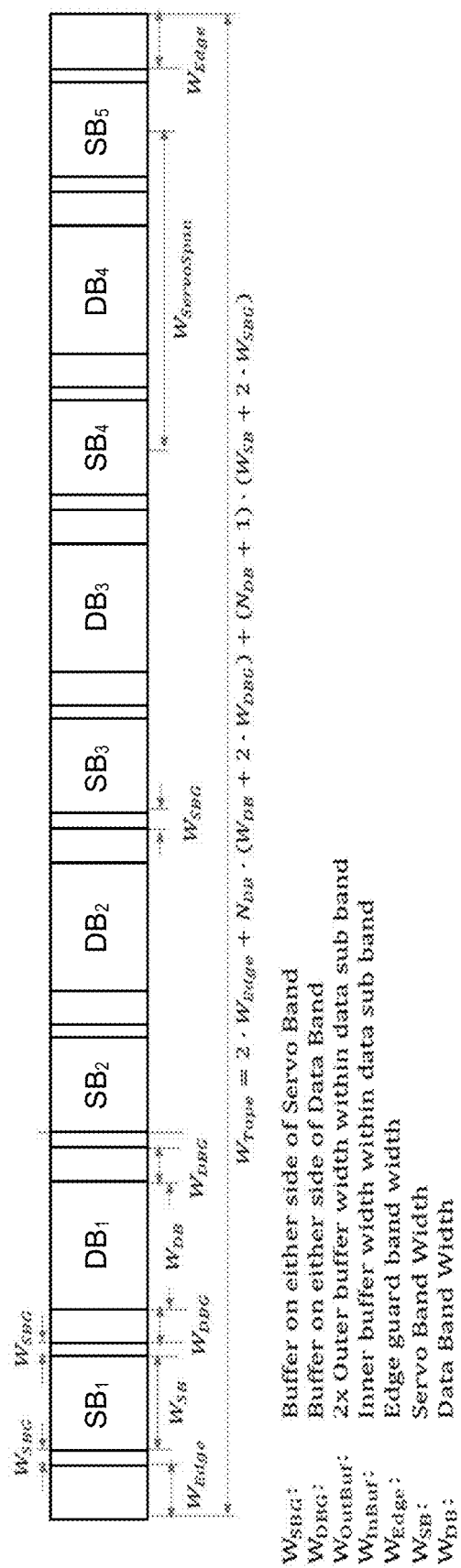
FIG. 19 is representational view of regions on a magnetic tape according to a conventional format.

FIG. 19 is a representation of regions on tape, according to a conventional format. Two edge guard bands, each of width $W_{Edge}$, are show, one on either end of the tape. No magnetic information is written in these regions. This is a four data band tape format ($N_{DB}=4$), labeled $DB_1$ to $DB_4$, each of width $W_{DB}$, and five servo bands, labeled $SB_1$ to $SB_5$, and each of width $W_{SB}$. The servo readers are designed to span the servo band while writing data within each data band. A buffer is located at either end of a data band (data band guard) of width $W_{DBG}$ and on either end of the servo band (servo band guard) of width $W_{SRG}$. The width of tape is given by Equation 9.

$$W_{Tape} = 2 \cdot W_{Edge} + N_{DB} \cdot (W_{DB} + 2 \cdot W_{DBG}) + (N_{DB}+1) \cdot (W_{SB} + 2 \cdot W_{SBG}). \qquad 9$$

The additions in Equation 9 relative to Equation 1 are the servo and data band guards which act as buffers between the servo bands and the data bands respectively to avoid overwriting these regions.

Figure 20:
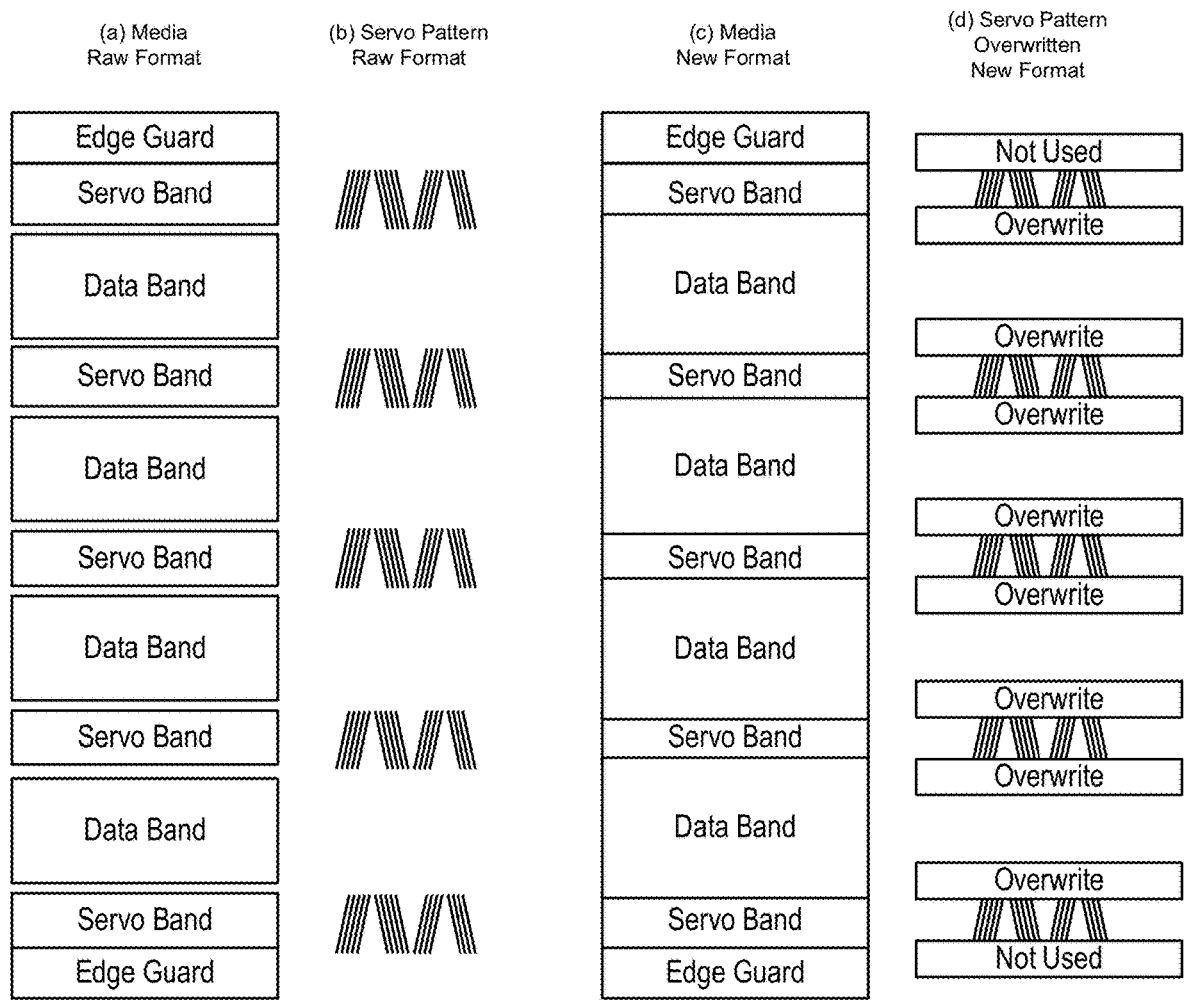
FIG. 20, part (a) is a representational view of magnetic tape media in raw format as provided by a supplier; part (b) is a representation of a servo band in raw format as provided by a supplier; part (c) is a representation view of the magnetic tape media of part (a) written by a magnetic head with wider element spacing according to a different format; part (d) is a representation of a partially overwritten servo band of part (b) by the magnetic head associated with the format of part (c), in accordance with an exemplary approach.

Part (a) of FIG. 20 depicts the media format in raw format from a tape media supplier. Shown are the Edge Guard band, five Servo Bands and four Data Bands. Part (b) of FIG. 20 shows a schematic of the servo pattern in a servo band. The tape runs left-to-right or right-to-left. The servo readers pass over the servo pattern which is located in the Servo Band regions in part (a) but is shown pictorially in part (b). For a timing-based servo, the time between peaks in the servo signal running over the servo pattern enables the drive to determine the vertical location of the servo within the servo band and thus the read and write transducers within the data band. For normal operation, the servo motion spans the height of the servo band while the write transducer or read transducer motions span the height of the data sub band, which is approximately the element pitch.

Part (c) of FIG. 20 shows a partially overwritten servo pattern and a wider Data Band generated by increasing the element pitch adjusting the location of the servo readers appropriately to enable the write transducers to span the element pitch as given by Equations 3 and 4. Part (d) is a representation of the partially overwritten servo pattern.

The span of the data sub bands, and thus the span of the data band, can be increased further if two servo readers, $S_n$ and $T_n$, are located in each servo band and the element pitch is increased further. For a 1-band module, there would be a total of two (2) S and two (2) T servo readers, one S and one T on one side of the array of $N_E$ write transducers or read transducers, and one S and one T on the other side of the array. With each servo in a servo band used to control (measure) the movement of the elements (data transducers) over half the data sub bands, the required width of the servo band can be essentially cut in half, freeing up more space for the data sub bands (or data band). The element pitch may be increased to enable the increased data band width.

Method to Write Data

Determination of writing process focuses on the sub data bands.

Figure 21:
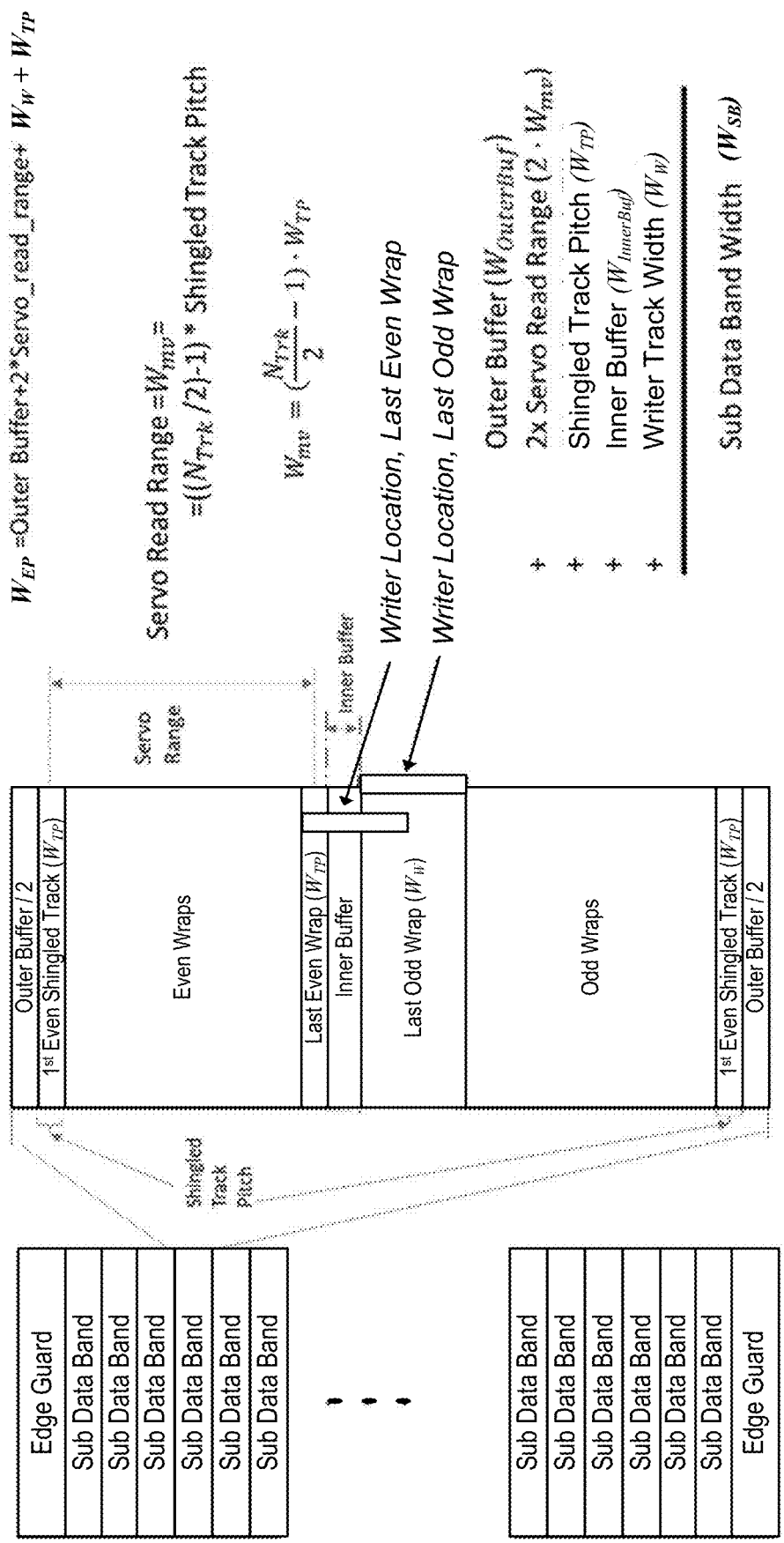
FIG. 21 is a representational view of data band and sub-data band composition, in accordance with an exemplary approach.

FIG. 21 is a representation of a Data Band (DB) and Sub Data Bands, SDB. The data band is surrounded by two data guard bands, each of width, $W_{DBG}$, which act as buffers between the data band and the surrounding servo bands. For a tape head with $N_E$ read and $N_E$ write elements and a drive with $N_{CH}$ read/write channels, where $N_E = N_{CH}$, the number of sub data bands is $N_E$. On the read/writer modules, the transducers are all separated by an element pitch of width, $W_{EP}$. The width of the data band, $W_{DB}$, then is given by the number of elements times the element pitch:

$$W_{DB} = N_E \cdot W_{EP}. \qquad 10$$

Each SDB has an Outer Buffer on either end with the width, $W_{OutBuf}/2$. The data is written from the top of the SB to the center on Even Wraps and from the bottom of the SDB to the center on Odd Wraps.

A total of $N_{trk}$ Wraps (or tracks) are written. One half will be in the Even Wraps and half will be in the Odd Wraps. For the first Even Wrap, the write transducer top edge abuts the lower edge of the top Outer Buffer. The data is shingled to a Track Pitch width, $W_{TP}$. The width of the Even Wrap data region within the DSB will be $W_{TP} \cdot N_{trk}/2$. Therefore, the write transducer will move a distance, $W_{mv}$, given by:

$$W_{inv} = \left(\frac{N_{trk}}{2} - 1\right) \cdot W_{TP}. \qquad 11$$

An Inner Buffer of width $W_{InBuf}$ is located between the Even and Odd Wraps region to ensure that the data in the lower half of the data sub band is not overwritten by the last Even written track and the data in the upper half of the data sub band is not overwritten by the last Odd Written track. The bottom of the final shingled track for the Even Wraps abuts the top of the Inner Buffer. For the first Odd Wrap, the bottom of the write transducer abuts the top of the Outer Buffer at the bottom of the SDB. For the final Odd Wrap, the top of the write transducer will be positioned at or slightly below the bottom of the Inner Buffer. This is to ensure that no data is overwritten. The width of the final Odd Wrap will then be the width of the write transducer as it is not shingled. The Data Sub Band width is the Element Pitch, which is calculated using Equation 12a:

$$W_{EP} = (N_{TrkR} - 1) \cdot W_{TP} + W_W + W_{OutBuf} + W_{InBuf}. \qquad 12a$$

Solving for $N_{TrkR}$ gives:

$$N_{TrkR} = \frac{W_{EP} - W_W - W_{InBuf} - W_{OutBuf} + W_{TP}}{W_{TP}} \qquad (12b)$$

$N_{TrkR}$ is a real number. Physically, the number of Wraps an integer, $N_{Trk}$. Since the number of Even and Odd wraps is the same, $N_{Trk}$ is and even integer:

$$\text{and } N_{Trk} = 2 \cdot \text{float}(N_{TrkR}/2), \qquad 12c$$

or $$N_{Trk} = 2 \cdot \text{floor}\left(\frac{W_{EP} - W_W - W_{InBuf} - W_{OutBuf} + W_{TP}}{2 \cdot W_{TP}}\right). \qquad 12d$$

floor(x) is the mathematical function which rounds down to the nearest integer.

The next step is to determine the required width of the servo bands. Two options for servo readers will be discussed. The simplest is a single servo in each servo band (single servo reader option). The second is using two separate servo readers, one to write the Even Wraps and a second to write the Odd Wraps (dual servo reader option). The two will be discussed below.

Single Servo Reader Option for $N_E = N_{CH}$

Using a single servo reader within a servo band when the number of channels is equal to the number of elements, $N_{CH} = N_E$, the width of the servo band and the distance between the servo reader and the nearest element, $W_{SE.EvenNE}$, can be explained using FIG. 21 Since the center of the reader is $$\frac{W_{TP} + W_{OutBuff}}{2}$$

below the top of the DSB for the first Even Read wrap and above the bottom of the DSB for the first Odd Read wrap, the read transducer will move a distance:

$$W_{mv.R} = W_{EP} - W_{TP} - W_{OutBuff} \qquad 13a$$

The servo readers move the same distance. The top edge of the servo reader abuts the top of the Servo Band (SB) for the first Even Read wrap and the bottom edge of the servo abuts the bottom edge of the SB for the first Odd wrap so the center of the servo will be $$\frac{W_S}{2}$$

from the top and bottom edge of the SB for the first Even and Odd wraps respectively. $W_S$ is the servo reader width. Thus, the width of the servo band will be:

$$W_{SB} = W_{mv.R} + 2 \cdot \frac{W_S}{2} = W_{EP} + W_S - W_{TP} - W_{OutBuff}. \qquad 13b$$

Figure 22:
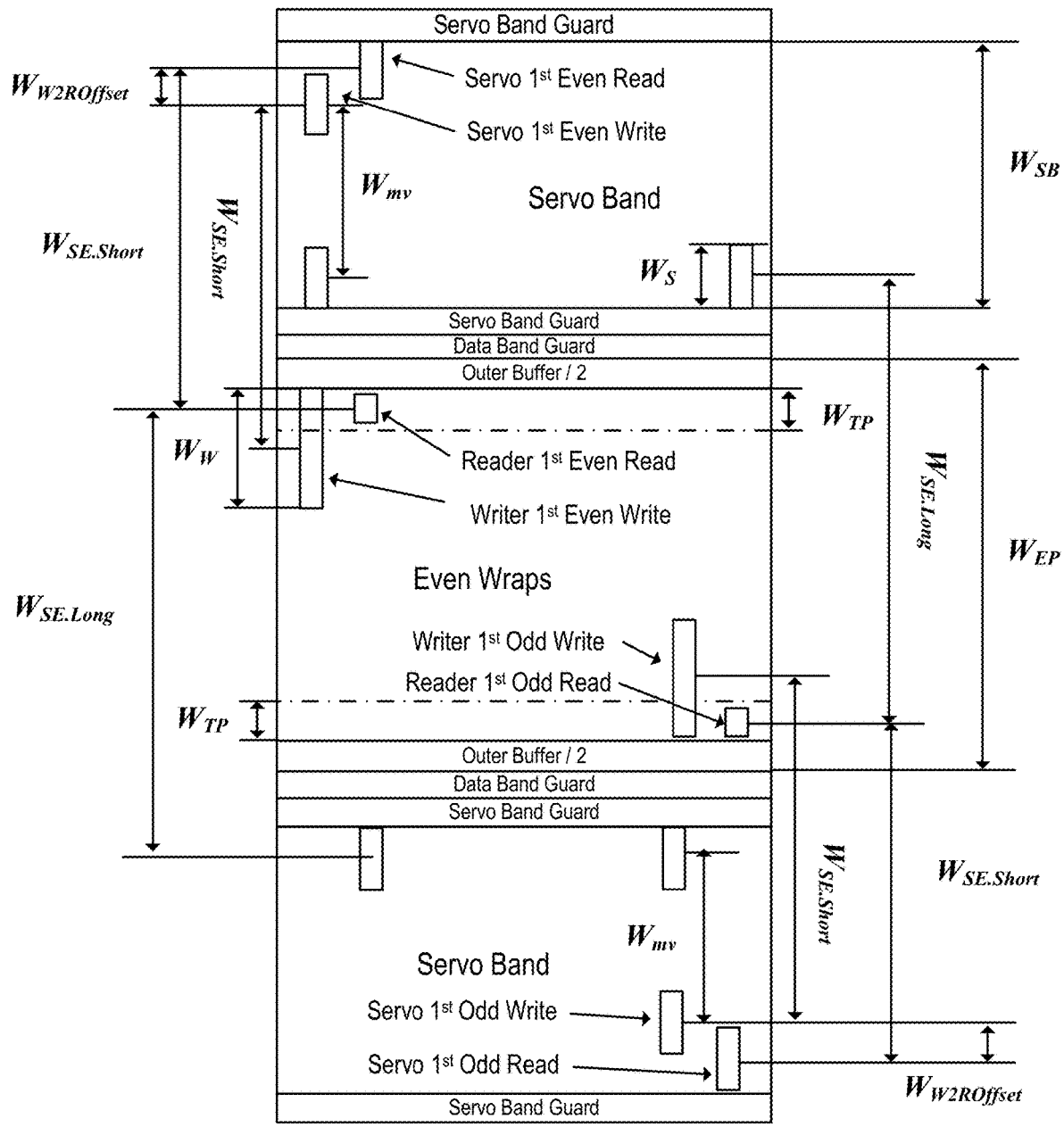
FIG. 22 is a schematic of the servo bands and a single sub data band, in accordance with an exemplary approach.

The distance between the center of the top servo reader and the center of the first read transducer can be determined viewing FIG. 22 for the first even read with the distance $W_{SE.EvenNE}$ labeled as $W_{SE.Short}$.

$$W_{SE.EvenNE} = W_{SB} - \frac{W_S}{2} + W_{SBG} + W_{DBG} + \frac{W_{OutBuff}}{2} + \frac{W_{TP}}{2}. \qquad 14a$$

Combining 13b with 14a yields:

$$W_{SE.EvenNE} = W_{EP} + \frac{W_S - W_{TP} - W_{OutBuff}}{2} + W_{SBG} + W_{DBG}. \qquad 14b$$

By symmetry, the distance from the lower servo reader to the last read transducer will also be given by Equation 14b. Note that the actual width of the data band is given by Equation 8 for $N_E$ transducers, but for explanation purposes a single DSB is sufficient and easier to show pictorially.

Equation 9 gives $W_{Tape}$ as a function of unknowns $W_{DB}$ and $W_{SB}$; Equations 10 and 13b respectively give $W_{DB}$ and $W_{SB}$ as a function of $W_{EP}$. Combining Equations 9, 10 and 13b solve for $W_{EP}$:

$$W_{EP} = \frac{W_{Tape} - 2 \cdot W_{Edge} - 2 \cdot N_{DB} \cdot W_{DBG} - (N_{DB} + 1) \cdot (W_S - W_{TP} - W_{OutBuff} + 2 \cdot W_{SBG})}{(N_{DB} \cdot N_E + N_{DB} + 1)}. \quad 15a$$

An approximation for $W_{EP}$ is:

$$W_{EP} \sim \frac{W_{Tape} - 2 \cdot W_{Edge}}{(N_{DB} \cdot N_E + N_{DB} + 1)}. \quad 15b$$

$W_{SB}$ can be determined using Equation 13b using the value for $W_{EP}$ from Equation 15a.

The Servo-to-Servo span, $W_{ServoSpan.Even}$, is given by:

$$W_{ServoSpan.Even} = 2 \cdot W_{SE.EvenNE} + (N_E - 1) \cdot W_{EP}. \quad 16a$$

$$W_{ServoSpan.Even} = (N_E + 1) \cdot W_{EP} + W_S - W_{TP} - W_{OutBuff} + 2 \cdot (W_{SBG} + W_{DBG}). \quad 16b$$

Thus, $W_{ServoSpan.Even} \sim (N_E + 1) \cdot W_{EP} + W_S. \quad 16c$

Single Servo Reader Option for $N_E = N_{CH} + 1$

Figure 23:
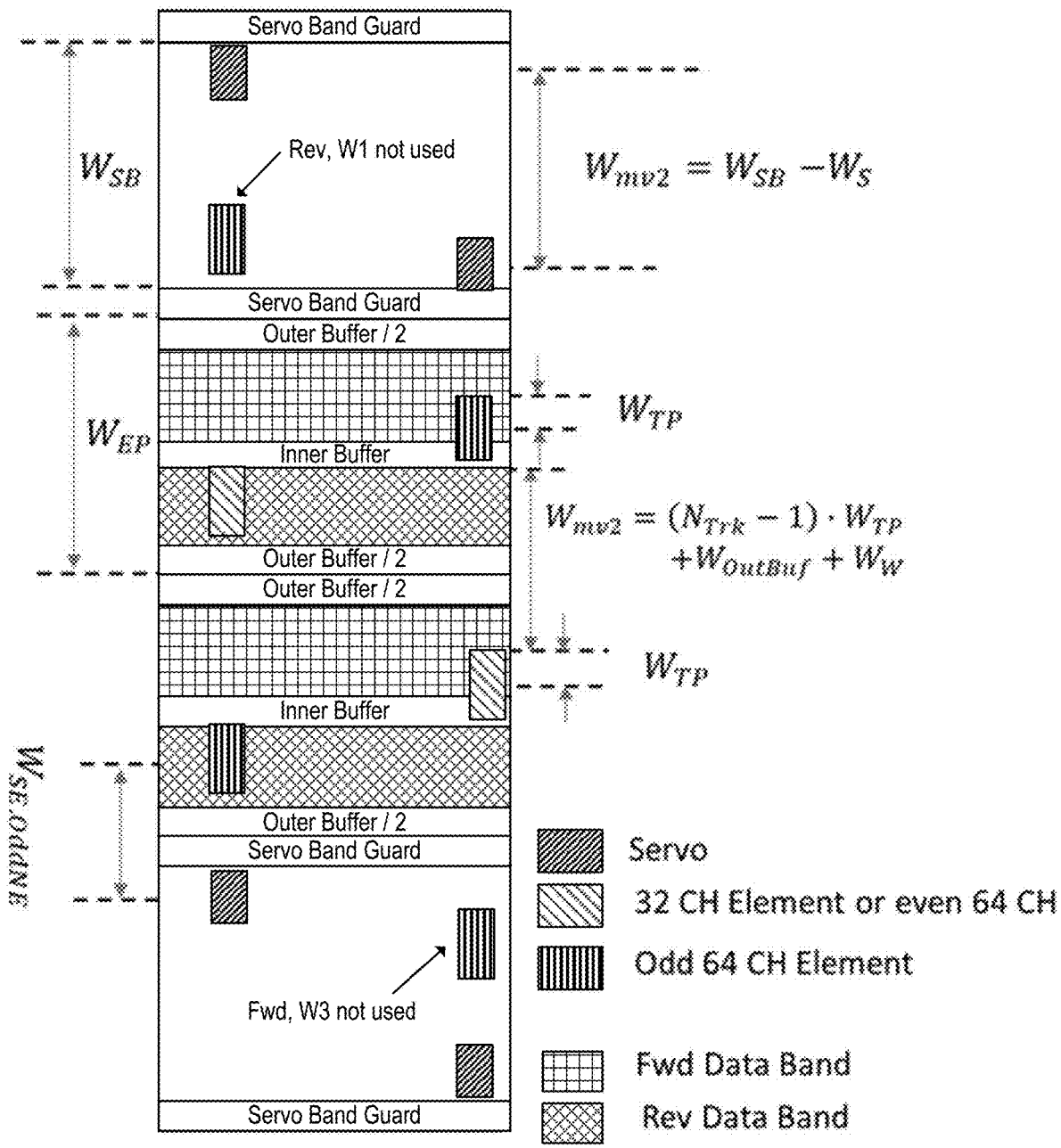
FIG. 23 is a schematic of the servo bands and a two sub data bands for one servo reader per servo band for the case where $N_E=3$ and $N_{CH}=2$, in accordance with an exemplary approach.

Another option is to use a single servo per servo band when the number of elements is one more than the number of channels, $N_E = N_{CH} + 1$. FIG. 23 shows a schematic of two servo bands surrounding two sub data bands in the case where $N_E = 3$ and $N_{CH} = 2$. The concept can be expanded to any case where $N_E = N_{CH} + 1$. The data band width is now given by Equation 17.

$$W_{DB} = N_{CH} \cdot W_{EP} = (N_E - 1) \cdot W_{EP}. \quad 17$$

A total of $N_{trk}$ Wraps (or $N_{trk}$) will be written. One half of the wraps will be in the Even Wraps written in Forward (Fwd.) direction and half will be in the Odd Wraps for the Reverse (Rev.) direction. In the Forward Wraps, the last write transducer is not used, data is written in the top half of the Data Sub Bands and the Servo uses the bottom half of the servo band. Thus, the position of the write transducer in the last Even Wrap defines the lowest location of the servo reader in the servo band. In the Reverse (Rev) Wraps, the first write transducer is not used, data is written in the bottom half of the Data Sub Bands and the Servo uses the Top half of the servo band. Thus, the position of the write transducer in the last Odd Wrap defines the highest location of the servo reader in the servo band. The distance the servo readers move, $W_{mv}$, then is given by:

$$W_{mv2} = W_{SB} - W_S. \quad 18a$$

The write transducers move the same distance given as:

$$W_{mv2} = (N_{Trk} - 1) \cdot W_{TP} + W_{OutBuff} + W_W. \quad 18b$$

Combining Equations 16a and 16b gives $W_{SB}$.

$$W_{SB} = W_S + (N_{Trk} - 1) \cdot W_{TP} + W_{OutBuff} + W_W \quad 18c$$

FIG. 21 shows the concept for the wraps and Equations 12a-d still determine $N_{trk}$. Combining Equation 12b (with $N_{Trk} = N_{TrkR}$) yields:

$$W_{SB} = W_{EP} + W_S - W_{InBuf} \quad 18d$$

Equation 9 gives $W_{Tape}$ with unknowns $W_{DB}$, and $W_{SB}$. Equations 17 and 18d respectively give $W_{DB}$, and $W_{SB}$ in terms of the unknown $W_{EP}$. Combining Equations 1, 17 and 18d yield a solution for $W_{EP}$:

$$W_{EP} = \frac{W_{Tape} - 2 \cdot W_{Edge} - 2 \cdot N_{DB} \cdot W_{DBG} - (N_{DB} + 1) \cdot (W_S + 2 \cdot W_{SBG} - W_{InBuf})}{N_{DB} \cdot (N_E - 1) + (N_{DB} + 1)}. \quad 19$$

The distance between the center of the Top Servo and the center of the first write transducer, $W_{SE.OddNE}$, can be determined observing FIG. 23 for the Forward Wraps: half the servo width plus the servo band guard, plus Outer Buffer/2 plus the distance the write transducer moves in Forward Wraps (Equation 11.

$$W_{mv} = \left(\frac{N_{Trk}}{2} - 1\right).$$

$W_{TP}$) plus, half the write transducer width:

$$W_{SE.OddNE} = \frac{W_S}{2} + W_{SBG} + \frac{W_{OutBuf}}{2} + \left(\frac{N_{Trk}}{2} - 1\right) \cdot W_{TP} + \frac{W_W}{2}. \quad 20a$$

Taking Equation 20a and replacing $N_{Trk}$ with $N_{TrkR}$ from Equation 12b yields:

$$W_{SE.OddNE} = \frac{W_{EP} + W_S - W_{InBuf} - W_{TP}}{2} + W_{SBG} \quad 20b$$

Note that, for $N_E = N_{CH}+1$, (i.e. Odd $N_E$), The distance of the servo reader to the nearest element is approximately half the element pitch plus half the servo reader width (($W_{EP}+W_S$)/2) while the Even $N_E$ case the distance is approximately one element pitch plus half the servo reader width ($W_{EP}+W_S$).

The Servo-to-Servo span, $W_{ServoSpan.Odd}$, is given by:

$$W_{Servospan.Odd} = 2 \cdot W_{SE.OddNE} + (N_E - 1) \cdot W_{EP}. \quad 21a$$

$$W_{Servospan.Odd} = N_E \cdot W_{EP} + W_S - W_{InBuf} - W_{TP} + 2 \cdot W_{SBG}. \quad 21b$$

Thus, $W_{ServoSpan.Odd} \sim N_E \cdot W_{EP} + W_S$. $\quad 21c$

Thus, for the two options of Even and the Odd $N_E$, both the data band width and the servo-to-servo span values (16c & 21c) are essentially the same.

Dual Servo Reader Option for $N_E = N_{CH}$

The dual servo reader option utilizes two servo readers in each servo band, termed $W_{SE.Short}$ and $W_{SE.Long}$, representing the distance from the given servo to the nearest element. FIG. 22 is a schematic of the servo bands and a single sub data band. The length of the data band region is $W_{DB}$, given by Equation 10. The schematic has the data band compressed to a single sub data band, which represents the first sub data band when viewed from the top servo band and the last sub data band ($N_E^{th}$) when viewed from the bottom servo band. The positioning of the write transducer within the sub data band is described above in Section titled "Method to Write Data".

Now the positioning of the servo readers will be described. For the Even (Odd) Wraps, SE.Short will span the Top (Bottom) servo band and SE.Long will span the Bottom (Top) servo band. For the Even Wraps, the distance between the center of the top servo reader and the center of the first read transducer can be determined as follows: The highest location of the servo reader is during first Even Wrap Read (see FIG. 22). The top edge of the top servo reader will abut the lower edge of the top servo band and the read transducer will be located half a Track Pitch below the top Outer Buffer. Thus the distance from the top servo reader, S.Short, to the first read transducer, $W_{SE.Short}$, will be:

$$W_{SE.Short} = W_{SB} - \frac{W_S}{2} + W_{SBG} + W_{DBG} + \frac{W_{OutBuff}}{2} + \frac{W_{TP}}{2}. \quad 22$$

This is the same Equation as used for the single servo reader option, but $W_{SB}$ will be different as shown below. Here is where the difference occurs. For the first Even Wrap, the top edge of the servo reader used in the lower servo band will abut the lower edge of the top servo band guard in that servo band. The separation from the last read transducer to the lower servo reader, S.Long, is labeled $W_{SE.Long}$ since it is further from the last read transducer than $W_{SE.Short}$ is from the first read transducer:

$$W_{SE.Long} = W_{EP} - \frac{W_{OuterBuf}}{2} - \frac{W_{TP}}{2} + W_{DBG} + W_{SBG} + \frac{W_S}{2}. \quad 23$$

The primary dimension determining the distance between the servo reader and the closest read transducer is $W_{SB}$ for $W_{SE.Short}$ and $W_{EP}$ for $W_{SE.Long}$. Since each pair of servo readers only spans half the data band for the even wraps, $W_{SB} \sim W_{EP}/2$, as will be shown below.

The Odd Wraps will also use a pair of servo readers, and by symmetry, they will have the same dimensions as the Even Wraps, except they will be reversed, with $W_{SE.Long}$ being in the top servo band and $W_{SE.Short}$ being in the bottom servo band. Thus, the order of elements from top to bottom will be: S.Long, S.Short, $N_E$ elements, S.Short, S.Long. The Servo Span, or distance from the top servo reader to the bottom servo reader will then be:

$$W_{ServoSpan.Even2S} = W_{SE.Short} + W_{SE.Long} + (N_E - 1) \cdot W_{EP}. \quad 24$$

The next step is to determine the length of the servo band. Observing FIG. 22, the top of the servo band is a distance $$\frac{W_S}{2}$$

above the center of S.Short positioned for the first Even Read Wrap. For the first Even Write Wrap, the write transducers are positioned so the top edge of the write transducer abuts the lower edge of the top Outer Buffer. The distance between the center of the write transducer and read transducer for the first Even Wrap is $W_{W2ROffset}$:

$$W_{W2ROffset} = (W_W - W_{TP})/2. \quad 25$$

The write transducer then will write $N_{trk}$ Wraps, stepping a distance $W_{TP}$ per Wrap (see FIG. 21). The distance moved, $W_{mv}$, is then:

$$W_{mv} = \left(\frac{N_{Trk}}{2} - 1\right) \cdot W_{TP}. \quad 26$$

The lower edge of the servo will abut the top of the lower servo band Guard, which is $W_S/2$ below the center of the servo. The servo band width, $W_{SB}$, is given by the sum of the terms described above.

$$W_{SB} = \frac{W_S}{2} + W_{W2ROffset} + W_{mv} + \frac{W_S}{2}. \quad 27a$$

Combining Equations 25, 26 and 27a gives:

$$W_{SB} = W_S + \left(\frac{N_{Trk}}{2} - 1\right) \cdot W_{TP} + \frac{W_W - W_{TP}}{2}. \qquad 27b$$

Substituting 10b into 27b (using $N_{Trk}$ for $N_{TrkR}$ from 12b) yields $W_{SB}$ in terms of $W_{EP}$:

$$W_{SB} = \frac{W_{EP} - W_{OutBuf} - W_{InBuf}}{2} + W_S - W_{TP}. \qquad 27c$$

To first order, $$W_{SB} = \frac{W_{EP}}{2} + W_S.$$

The final dimension needed is $W_{EP}$, which is solved using Equation 9 for $W_{Tape}$, which contains the dimensions $W_{DB}$ (Equation 8) and $W_{SB}$ (Equation 20c):

$$W_{EP} = \left(\frac{W_{Tape} - 2 \cdot W_{Edge} - 2 \cdot N_{DB} \cdot W_{DBG} - (N_{DB} + 1) \cdot \left(W_S + 2 \cdot W_{SBG} - W_{TP} + (W_{OutBuf} - W_{InBuf})/2\right)}{\left(N_E \cdot N_{DB} + \frac{(N_{DB} + 1)}{2}\right)}\right). \qquad 28$$

The optimum choice of Element (transducer) Pitch, $W_{EP}$, is then determined using the tape input values of tape Width $W_{Tape}$, Edge Guard Band width $W_{Edge}$, Number of data bands $N_{DB}$, and the head/drive parameter of the number of transducers (elements) $N_E$ and the servo band guard $W_{SBG}$ and data band guard $W_{SBG}$ and the Outer and Inner Buffers $W_{OutBuf}$ and $W_{InBuf}$ chosen for drive operation. To first order, $W_{EP}$ is $$W_{EP} \sim \frac{W_{Tape} - 2 \cdot W_{Edge}}{N_E \cdot N_{DB}}, \qquad 29$$

which is the used portion of tape ($W_{Tape} - 2 \cdot W_{Edge}$) divided by the total number of sub data bands ($N_E \cdot N_{DB}$).

Head Assembly/Alignment, 1-Band Head and Dual Servo Reader Option

Figure 24:
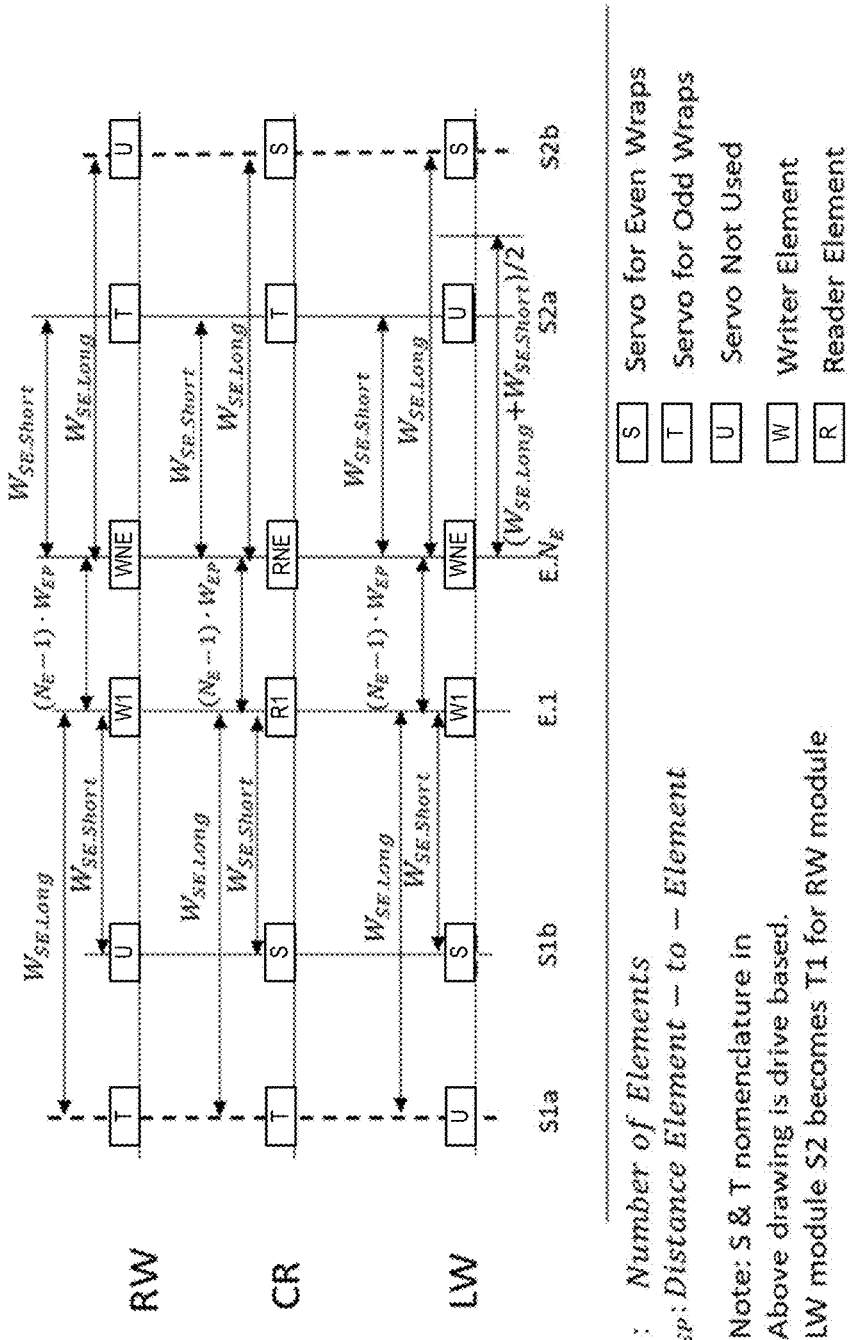
FIG. 24 is a schematic for a 1-band head with $N_E$ transducers utilizing a dual servo reader option for a 3-module head alignment with a Left (LW) and Right (RW) Writer and Center Read transducer (CR). S and T servo readers are for forward and reverse writing and reading respectively and U unused servo readers, in accordance with an exemplary approach.

A 1-Band Head is one where the elements span a single band, surrounded by servo bands. FIG. 24 is a schematic for a 1-Band Head with $N_E$ transducers utilizing a dual servo reader option for a 3-module head alignment with a Left Write transducer (LW) and Right Write transducer (RW) and Center Read transducer (CR). To match FIG. 24 alignment with FIGS. 21-22, the picture is rotated 90 degrees clockwise. LW refers to media traveling from Left to Right in FIGS. 21-22, so LW will be writing and the CR will be reading Even Wraps. RW refers to media traveling from Right to Left in FIGS. 3 and 4 so LW will be writing and the CR will be reading Odd Wraps. S servo readers, S1b and S2b will be used for Even Wraps and T servo readers, S1a and S2a, for Odd Wraps.

Head Assembly/Alignment, 2-Band Head and Dual Servo Reader Option

A 2-Band Head is one where the transducers span two bands, half the transducers are in one band and the other half are in an adjacent band, with 3 groups of servo readers in 3 servo bands. For a 2-Band head, the media should have an even number of data bands with data being written to or read from two adjacent data bands simultaneously. The arrangement during read or write is: SB, DB, SB, DB, SB.

Figure 25:
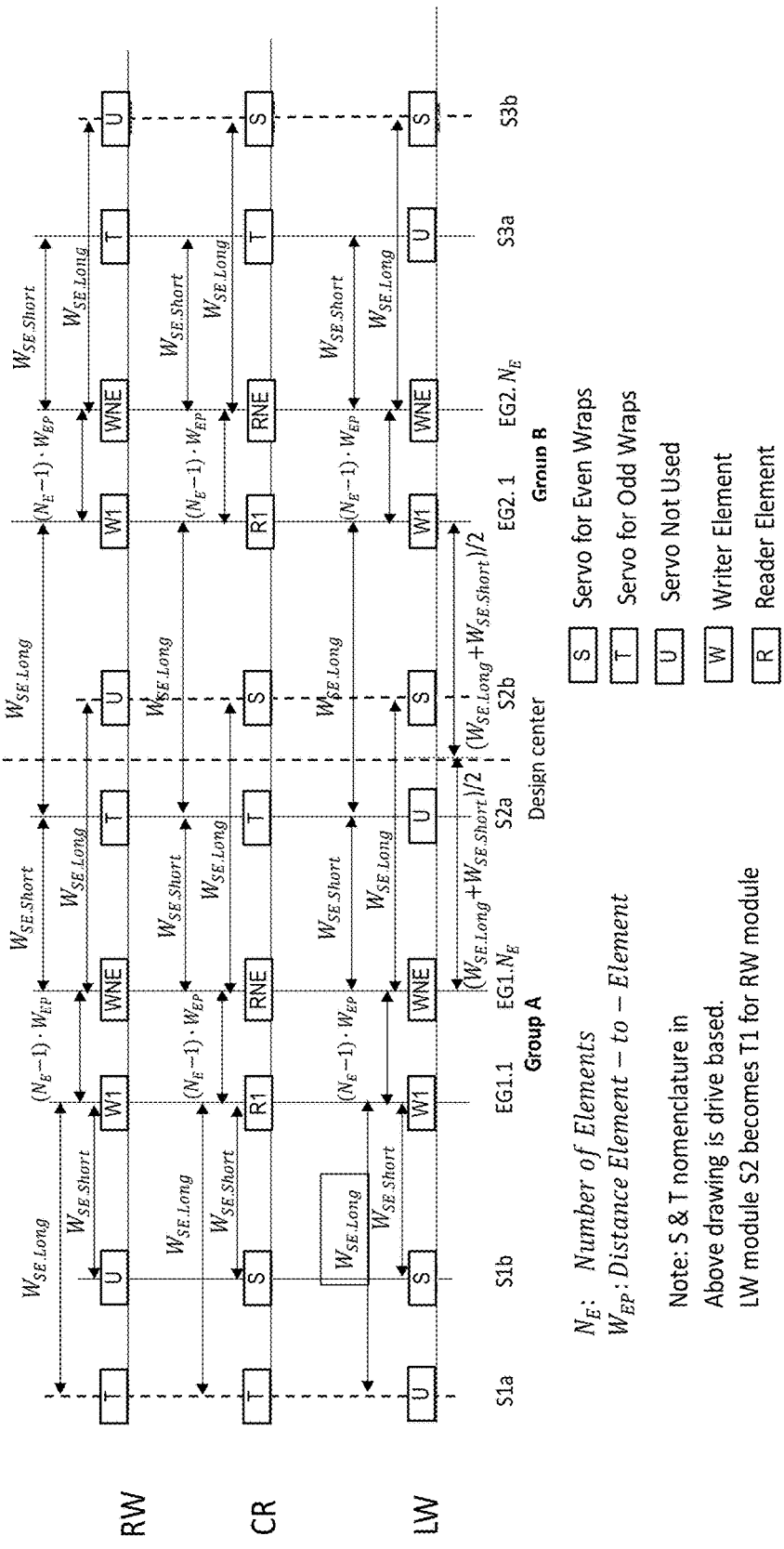
FIG. 25 is a schematic for a 2-band head with $2^N E$ transducers in each Group (A and B) utilizing a dual servo reader option for a 3-module head alignment with a LW and RW and CR. S and T servo readers are for forward and reverse writing and reading respectively and U unused servo readers, in accordance with an exemplary approach.

FIG. 25 is a schematic for a 2-Band Head with $N_E$ transducers in each Group (A and B) utilizing a dual servo reader option for a 3-module head alignment with a Left Write transducer, (LW), a Right Write transducer, (RW), and Center Read transducer, (CR). To match FIG. 25 alignment with FIGS. 21 and 22, the picture is rotated 90 degrees clockwise. LW refers to media traveling from Left to Right in FIGS. 21 and 22 so LW will be writing and the CR will be reading Even Wraps (Forward or Fwd.). RW refers to media traveling from Right to Left in FIGS. 21 and 22 so RW will be writing and the CR will be reading Odd Wraps (Reverse or Rev.). S servo readers, Snb, will be used for Even Wraps and T servo readers, Sna, for Odd Wraps (or vice versa).

Because of the cost of wafer processing and redesigning a servo scheme for the media, a general design is often reused for several generations. The head design of Element Pitch and servo reader locations may remain fixed and only parameters such as read transducer and write transducer widths and track pitch are changed to achieve higher capacity. The media servo pattern locations and widths remain unchanged, only modifying the media properties such as magnetic layers, surface roughness, substrate thickness and length needed for higher capacity.

The change in the optimum Element Pitch is not affected by the writer width.

$$\frac{\partial W_{EP}}{\partial W_W} = \frac{\partial W_{SE.Long}}{\partial W_W} = \frac{\partial W_{SE.Short}}{\partial W_W} = 0 \qquad 30$$

The dependence on optimized $W_{EP}$ and a change in $W_{TP}$ is given by:

$$\frac{\partial W_{EP}}{\partial W_{TP}} = \frac{(N_{DB} + 1)}{\left(N_E \cdot N_{DB} + \frac{(N_{DB} + 1)}{2}\right)} \sim 1/N_E \qquad 31$$

For $N_E=64$ and $W_{TP}$ changing from 500 to 200 nm, the change in the optimum $W_{EP}$ is only 4.7 nm. By using a design calculated for a fixed $W_{TP}$ of 350 nm, the head will function for the full range with minor or no reduction in the capacity ($N_{trk}$) for a $W_{TP}$ other than 350 nm.

The change in $W_{SE.Long}$ and $W_{SE.Short}$ with changes in $W_{TP}$ are given here:

$$\frac{\partial W_{SE.Long}}{\partial W_{TP}} = \frac{\partial W_{SE.Short}}{\partial W_{TP}} = -0.5 \qquad 32$$

A change in $W_{TP}$ from 500 to 200 nm will change the optimum $W_{SE.Long}$ and $W_{SE}$.Shor t by-150 nm each. By using a design calculated for a fixed $W_{TP}$ of 350 nm, the head will function for the full range with minor or no reduction in the capacity ($N_{trk}$) for $W_{TP}$ other than 350 nm. Since the design will be for a given media, the locations and sizes of the servo patterns remain unchanged resulting in only minor or no reduction in the capacity achieved compared to the optimum.

Head Design

Extant reader and writer tape modules for a magnetic head assembly are developed by depositing material onto a ceramic substrate. The deposition is built up vertically. For a ringed write transducer, the first pole deposited is termed P1 and the latter deposited pole is P2. From the tape bearing surface, TBS, one sees the outline of P1, a Gap of non-magnetic material and P2. FIG. 8 is a schematic for a 1-Band Head with $N_E$ transducer utilizing a dual servo reader option for a 3-module head alignment with a LW and RW and CR. The LW and RW respectively write while Media moving from Left-to-Right and Right-to-Left. (a) write transducer pole P2 is the trailing edge; (b) write transducer pole P1 is the trailing edge. Because of processing constraints, the geometry of P1 and P2 are often different. The trailing pole material dominates the quality of the written magnetic bit transition. Because of differences in processing either P1 or P2 trailing could be preferrable. With the symmetric design described in this disclosure, one can use either P1 or P2 trailing without modifying the drive code. Because of the long time and large cost in building wafers and developing drive code, the versatility in enabling either P1 or P2 trailing designs with the same wafer is highly beneficial in time, effort, and cost.

Media Reuse

Extant reader and writer magnetic tape heads are developed by depositing material onto a ceramic substrate. The deposition is built up vertically. For a ringed write transducer, the first pole deposited is termed P1 and the latter deposited pole is P2. From the tape bearing surface, TBS, one sees the outline of P1, a Gap of non-magnetic material and P2.

Figure 26:
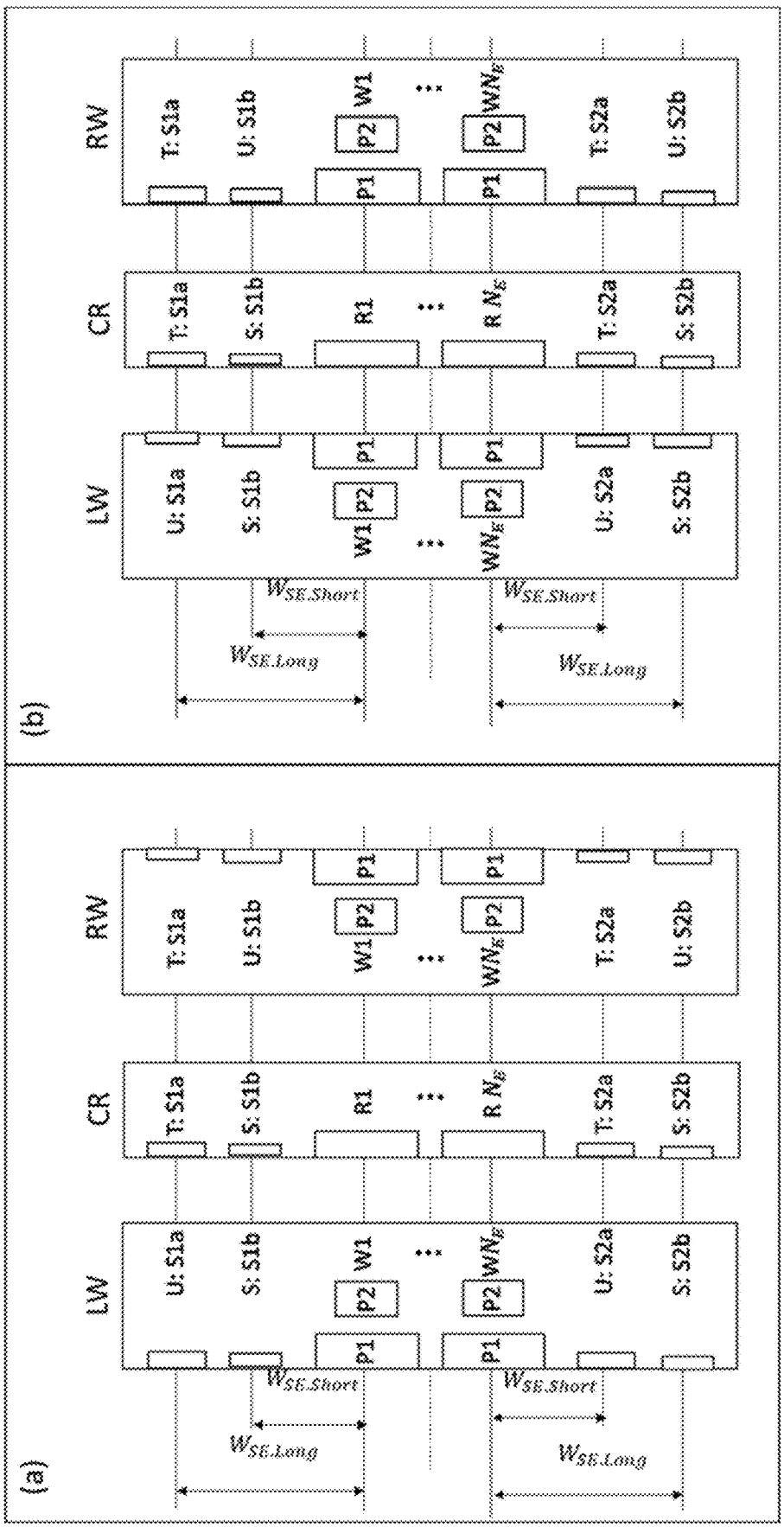
FIG. 26 is a schematic for a 1-band head with $N_E$ transducers utilizing a dual servo reader option for a 3-module head alignment with a LW, RW and CR, in accordance with an exemplary approach.

FIG. 26 is a schematic for a 1-Band Head with $N_E$ transducers utilizing a dual servo reader option for a 3-module head alignment with a LW, RW, and CR. The LW and RW respectively write while media moves from Left-to-Right and Right-to-Left. Part (a) of FIG. 26 depicts a write transducer pole P2 is the trailing edge; Part (b) depicts write transducer pole P1 is the trailing edge. Because of processing constraints, the geometry of P1 and P2 are often different. The trailing pole material dominates the quality of the written magnetic bit transition. Because of differences in processing either P1 or P2 trailing could be preferable. With the symmetric design described in this disclosure, one can use either P1 or P2 trailing without modifying the drive code. Because of the long time and large cost in building wafers and developing drive code, the versatility in enabling either P1 or P2 trailing designs with the same wafer is highly beneficial in time, effort, and cost.

Tilted Head for Tape Dimensional Stability Compensation

In writing data to tape with a multi-transducer Read/Write head, the effective spacing between transducers can increase or decrease due to changes in spacing on the head and/or in the media. Expansion or contraction of the head and/or media width due to thermal effects, humidity or other stresses can occur. One methodology of correcting for these changes is to tilt the head at an angle relative to the track direction according to known methods. For example, if the media moves in the x direction and the track pitch is in the y direction, rotating the head by an angle $\theta$ relative to the y axis will shorten the effective track pitch in the frame of the tape. The head can be built with a fixed value of $\theta_o$ and active compensation of the angle about the center can be done. The analysis given so far can be generalized to include the head tilt concept by analyzing the dimensions in the reference of the media. Thus, the media dimensions, $d_{media}$, are fixed and the head dimensions, $d_{head}$, are translated to the media reference plane by multiplying by cos ($\theta_o$). The calculations for the head dimensions, are then done in the reference plane of the media and then translated back to the head reference frame by multiplying by 1/cos ($\theta_o$).

Media Parameters Include:

$W_{Tape}$, $W_{Edge}$, $W_{DB}$, $W_{DBG}$, $W_{SB}$, $W_{SBC}$, $W_{OutBuf}$, $W_{InBuf}$ and $W_{TP}$, as described elsewhere herein.

Head parameters include: $W_S$, $W_W$, $W_R$, and $W_{EP}$, as described elsewhere herein.

Figure 27:
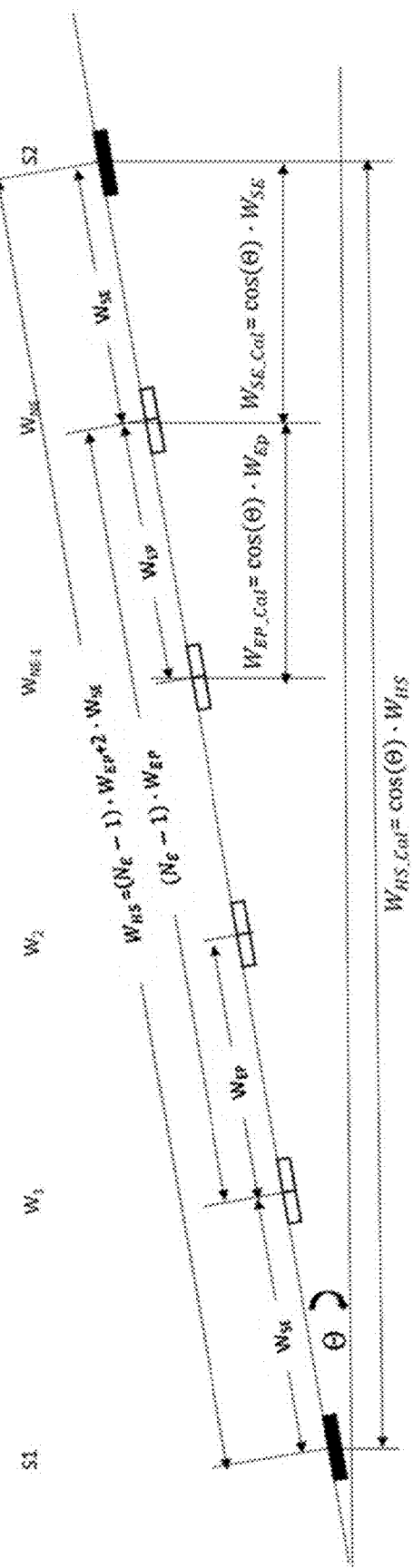
FIG. 27 is a schematic of a tilted head concept for tape dimensional stability (TDS) compensation, in accordance with an exemplary approach.

FIG. 27 shows the concept of tilting pictorially, e.g., for tape dimensional stability (TDS) compensation, whereby said concept may be applied to various aspects of the present invention, as would become apparent to one skilled in the art after reading the present disclosure. The Pisa angle is the nominal angle $\theta$ of tilt.

Media Reuse Examples

An example of media reuse includes using media designed for a given set of head parameters with a new head design having parameters designed for a higher capacity, but which can fit within the original media design, but will overwrite a portion of the pre-written servo pattern. With a fixed media width, $W_{Tape}$, and edge guard band, $W_{Edge}$, and track pitch, $W_{TP}$, and write transducer width $W_W$ and Buffers, Equation 12d shows that the means of increasing the capacity (i.e. $N_{trk}$) is by increasing the Element (transducer) Pitch $W_{EP}$. Here an evaluation of different options is explored.

Table 1 gives general Media and Head parameters common to the three designs evaluated. Table 2 gives an evaluation of four head designs and operating points using the Equations described above. Design D1 is a legacy design using 1 servo reader per servo band, 33 transducers and 32 data channels which is not optimized for capacity. Designs D2 and D3 use 1 servo reader per servo band and have 33 and 32 transducers respectively and are optimized for capacity. Design D4 uses 2 servo readers per servo band and uses 32 transducers and 32 channels and is optimized for capacity. Designs D2, D3 and D4 can use the media for designs D1 by overwriting the servo band Pattern with respective gains in capacity of 4.1, 4.1 and 6.8%. Design D4 can also use the media from Designs D2 and D3 by overwriting a portion of their servo bands with a gain in capacity of 2.7%. To make the designs compatible, the Edge guard band, $W_{Edge}$, was fixed.

Designs D5 to D7 are for a 1-Band Head using three (3) data bands. Designs D5 and D6 are designed to use the same Head structure containing 65 transducers and 2 servo readers. Design D5 is a 64 Channel head with half the Element Pitch or the 32 Chanel head design, D6. Design D6 is optimized for capacity and the Element pitch for Design D5 is half that of Design D6. Designs D5 and D6 use the same head and media structure but require separate servo readers to operate. Design D7 thus is not fully optimized for capacity and does not use the available servo band width from D6 but does use the same media as Design D6. This allows for using the same Head and Media for a 32 and a 64 Channel operation. The dramatic drop in capacity for Design D6 compared to D7 (−8.2%) is primarily due to the fact that $N_{trk} \sim (W_{EP}-W_W)/W_{TP}$. Since $W_W$ is 17% of $W_{EP}.64$ and only 8.7% of $W_{EP.32}$, the write transducer width reduces the capacity more for the 64-channel design than for the 32-channel design for the 1-band design. Design D7 uses 2 Servos per servo band, also with a 3-Band Media design. Design D7 can reuse media from the D6 design with a gain in capacity of 3.1%.

TABLE 1

General Media and Head parameters common to the designs

| $N_{DB}$ # | $W_{Tape}$ mm | $W_{Edge}$ mm | $W_S$ mm | $W_W$ mm | $W_{SBG}$ mm | $W_{OutBuf}$ mm | $W_{InBuf}$ mm | $W_{TP}$ mm |
|---|---|---|---|---|---|---|---|---|
| 4 | 12,650 | 558.5 | 2.0 | 10.0 | 4 | 0.25 | 0.25 | 0.5 |

TABLE 2

Comparison of design for variations in number of servo readers per band and $N_E$.

| Design # | $W_{DBG}$ mm | Servo reader per SB # | $N_{DB}$ # | $N_E$ | $N_{CH}$ # | $W_{EP}$ mm | $N_{trk}$ # | $W_{SB}$ mm | $W_{SE.Long}$ mm | $W_{SE.Short}$ mm | Capacity $N_{DB} \cdot N_E \cdot N_{trk}$ # | Capacity Gain % |
|---|---|---|---|---|---|---|---|---|---|---|---|---|
| D1* | 46.5 | 1 | 4 | 33 | 32 | 83.25 | 146 | 93.00 | 97.5 | | 18688 | 0.0% |
| D2 | 0 | 1 | 4 | 33 | 32 | 86.33 | 152 | 88.58 | 47.79 | | 19456 | 4.1% |
| D3 | 0 | 1 | 4 | 32 | 32 | 86.37 | 152 | 87.62 | 90.99 | | 19456 | 4.1% |
| D4 | 0 | 2 | 4 | 32 | 32 | 88.02 | 156 | 45.26 | 92.90 | 48.64 | 19968 | 6.8% |
| D5 | 0 | 1 | 3 | 65 | 64 | 58.63 | 96 | 60.88 | 33.94 | | 18432 | −1.4% |
| D6 | 0 | 1 | 3 | 32 | 32 | 114.96 | 208 | 116.21 | 119.59 | | 19968 | 6.8% |
| D7 | 0 | 2 | 3 | 32 | 32 | 117.31 | 214 | 59.90 | 122.18 | 63.28 | 20544 | 9.9% |
| D8 | 0 | 1 | 1 | 65 | 64 | 174.43 | 328 | 176.68 | 91.84 | | 20992 | 12.3% |

Capacity gain is relative to the lowest capacity option evaluated (1 servo per servo band, SB) (1) and highest number of transducers (33), which has the lowest $W_{EP}$.
General parameters are given in Table 1.
*Design D1 is a legacy design which is not optimized for capacity, $W_{DBG}$ = 49 mm.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration but are not intended to be exhaustive or limited to the approaches disclosed. Many modifications and variations will be apparent to those of ordinary skill in the art without departing from the scope and spirit of the described approaches. The terminology used herein was chosen to best explain the principles of the present invention, the practical application or technical improvement over technologies found in the marketplace, or to enable others of ordinary skill in the art to understand the approaches disclosed herein.

What is claimed is:

1. A method, comprising:
   writing, by a tape drive, data tracks to a data band of a magnetic tape having servo bands flanking the data band, the writing being performed using a magnetic head that is not designed for a format of the magnetic tape,
   wherein an effective pitch of servo readers of the magnetic head used simultaneously during the writing matches a servo reader pitch specification of the format of the magnetic tape,
   wherein an average effective pitch of write transducers of the magnetic head is greater than a data track pitch specification of the format of the magnetic tape.

2. A method as recited in claim 1, wherein the servo bands are not overwritten with data tracks during the writing.

3. A method as recited in claim 1, wherein a portion of each of the servo bands is overwritten with data tracks during the writing.

4. A method as recited in claim 1, wherein centerlines of portions of the servo bands used during the writing are original centerlines of the servo bands.

5. A method as recited in claim 1, wherein the magnetic head has at least two servo readers positioned on one side of an array of magnetic write transducers and at least two servo readers positioned on an opposite side of the array of magnetic write transducers, wherein the tape drive is configured to use a first one of the servo readers positioned on each side of the array for writing data tracks in a first portion of the data band and to use a second one of the servo readers positioned on each side of the array for writing data tracks in a second portion of the data band.

6. A method as recited in claim 1, wherein centerlines of portions of the servo bands used during the writing are offset from original centerlines of the servo bands.

7. A computer program product for enabling use of a magnetic tape by a tape drive not designed for a format of the magnetic tape, the computer program product comprising a computer readable storage medium having program instructions embodied therewith, the program instructions executable by the tape drive to cause the tape drive to:
   write, by the tape drive, data tracks to a data band of a magnetic tape having servo bands flanking the data band, the writing being performed using a magnetic head that is not designed for a format of the magnetic tape,
   wherein an effective pitch of servo readers of the magnetic head used simultaneously during the writing matches a servo reader pitch specification of the format of the magnetic tape,
   wherein an average effective pitch of write transducers of the magnetic head is greater than a data track pitch specification of the format of the magnetic tape.

8. An apparatus, comprising:
   a drive mechanism for passing a magnetic tape over a magnetic head; and
   a controller electrically coupled to the magnetic head,
   the controller being configured to:
      cause the magnetic head to write data tracks to a data band of a magnetic tape having servo bands flanking the data band,
      the magnetic head is not designed for a format of the magnetic tape, wherein an effective pitch of servo readers of the magnetic head used simultaneously during the writing matches a servo reader pitch specification of the format of the magnetic tape, wherein an average effective pitch of write transducers of the magnetic head is greater than a data track pitch specification of the format of the magnetic tape.

9. An apparatus as recited in claim 8, wherein the servo bands are not overwritten with data tracks during the writing.

10. An apparatus as recited in claim 8, wherein a portion of each of the servo bands is overwritten with data tracks during the writing.

11. An apparatus as recited in claim 8, wherein centerlines of portions of the servo bands used during the writing are original centerlines of the servo bands.

12. An apparatus as recited in claim 8, wherein the magnetic head has at least two servo readers positioned on one side of an array of magnetic write transducers and at least two servo readers positioned on an opposite side of the array of magnetic write transducers, wherein the apparatus is configured to use a first one of the servo readers positioned on each side of the array for writing data tracks in a first portion of the data band and to use a second one of the servo readers positioned on each side of the array for writing data tracks in a second portion of the data band.

13. An apparatus as recited in claim 8, wherein centerlines of portions of the servo bands used during the writing are offset from original centerlines of the servo bands.

14. A method, comprising:
writing, by a tape drive, data tracks to a data band of a magnetic tape having servo bands flanking the data band, the writing being performed using a magnetic head that is not designed for a format of the magnetic tape,
wherein an effective pitch of servo readers of the magnetic head used simultaneously during the writing does not match a servo reader pitch specification of the format of the magnetic tape,
wherein an average effective pitch of write transducers of the magnetic head is greater than a data track pitch specification of the format of the magnetic tape.

15. A method as recited in claim 14, wherein the servo bands are not overwritten with data tracks during the writing.

16. A method as recited in claim 14, wherein a portion of each of the servo bands is overwritten with data tracks during the writing.

17. A method as recited in claim 14, wherein the magnetic head has at least two servo readers positioned on one side of an array of the magnetic write transducers and at least two servo readers positioned on an opposite side of the array of the magnetic write transducers, wherein the tape drive is configured to use a first one of the servo readers positioned on each side of the array for writing data tracks in a first portion of the data band and to use a second one of the servo readers positioned on each side of the array for writing data tracks in a second portion of the data band.

18. A method as recited in claim 14, wherein centerlines of portions of the servo bands used during the writing are offset from original centerlines of the servo bands.

19. A method as recited in claim 14, wherein the effective pitch of the servo readers of the magnetic head used simultaneously during the writing is less than the servo reader pitch specification of the format of the magnetic tape.

20. A method as recited in claim 14, wherein one of the servo bands is completely overwritten with data tracks during the writing.

21. A method as recited in claim 20, wherein an effective pitch of servo readers of the magnetic head used simultaneously during the writing is greater than a width of two data bands on the magnetic tape.

22. A method as recited in claim 20, wherein the magnetic head has at least two servo readers positioned on one side of an array of magnetic write transducers and at least two servo readers positioned on an opposite side of the array of magnetic write transducers, wherein the tape drive is configured to use a first one of the servo readers positioned on each side of the array for writing a first set of the data tracks and to use a second one of the servo readers positioned on each side of the array for writing a second set of data tracks.

23. A computer program product for enabling use of a magnetic tape by a tape drive not designed for a format of the magnetic tape, the computer program product comprising a computer readable storage medium having program instructions embodied therewith, the program instructions executable by the tape drive to cause the tape drive to perform the method of claim 14.

24. An apparatus, comprising:
a drive mechanism for passing a magnetic tape over a magnetic head; and
a controller electrically coupled to the magnetic head, the controller being configured to perform the method of claim 14.

25. An apparatus as recited in claim 24, wherein the magnetic head has at least two servo readers positioned on one side of an array of the magnetic write transducers and at least two servo readers positioned on an opposite side of the array of the magnetic write transducers, wherein the apparatus is configured to use a first one of the servo readers positioned on each side of the array for writing data tracks in a first portion of the data band and to use a second one of the servo readers positioned on each side of the array for writing data tracks in a second portion of the data band.

* * * * *